United States Patent
Schwartz et al.

(10) Patent No.: US 8,086,050 B2
(45) Date of Patent: Dec. 27, 2011

(54) MULTI-RESOLUTION SEGMENTATION AND FILL

(75) Inventors: Edward L. Schwartz, Sunnyvale, CA (US); Kathrin Berkner, Santa Clara, CA (US)

(73) Assignee: Ricoh Co., Ltd., Tokyo (JP)

( * ) Notice: Subject to any disclaimer, the term of this patent is extended or adjusted under 35 U.S.C. 154(b) by 1441 days.

(21) Appl. No.: 10/927,323

(22) Filed: Aug. 25, 2004

(65) Prior Publication Data

US 2006/0045357 A1    Mar. 2, 2006

(51) Int. Cl.
*G06K 9/36*    (2006.01)

(52) U.S. Cl. .................. 382/232; 345/555; 358/426.01; 708/203

(58) Field of Classification Search .................. 382/232; 345/555; 358/426.01–426.16; 708/203
See application file for complete search history.

(56) References Cited

U.S. PATENT DOCUMENTS

| | | | | |
|---|---|---|---|---|
| 5,900,953 A | * | 5/1999 | Bottou et al. | 358/540 |
| 6,608,928 B1 | * | 8/2003 | Queiroz | 382/173 |
| 7,120,297 B2 | * | 10/2006 | Simard et al. | 382/166 |
| 2003/0072487 A1 | * | 4/2003 | Fan et al. | 382/176 |
| 2003/0133617 A1 | * | 7/2003 | Mukherjee | 382/239 |
| 2003/0202697 A1 | | 10/2003 | Simard et al. | |
| 2004/0042672 A1 | * | 3/2004 | Nozu | 382/233 |
| 2004/0042687 A1 | * | 3/2004 | Curry et al. | 382/302 |

FOREIGN PATENT DOCUMENTS

| | | |
|---|---|---|
| CN | 1458791 A | 11/2003 |
| EP | 1 388 815 A2 | 2/2007 |
| JP | 2004-96373 | 3/2004 |
| JP | A 2005-515727 | 5/2005 |

OTHER PUBLICATIONS

First Office Action (and English translation, 5 pages) for Chinese Application No. 200510096607.5, Issue Date Oct. 19, 2007, 5 pgs.
Second Office Action (and English translation, 3 pages) for Chinese Application No. 200510096607.5, Action Date Aug. 29, 2007, 4 pgs.
Japanese Office Action for corresponding Japanese Patent Application No. 2005-244779, dated Jul. 13, 2010, 3 pgs.

* cited by examiner

*Primary Examiner* — Vikkram Bali
*Assistant Examiner* — Eueng-Nan Yeh
(74) *Attorney, Agent, or Firm* — Blakely, Sokoloff, Taylor & Zafman LLP

(57) ABSTRACT

A multi-resolution segmentation and fill technique is disclosed. In one embodiment, the method comprises generating a plurality of layers using image data from multiple resolutions, generating a mask describing compositing of the plurality of layers to obtain the image, and filling pixels in each of the plurality of layers where the pixels being filled are those that do not contribute to the image when the plurality of layers are composited.

23 Claims, 27 Drawing Sheets

```
┌─────────────────────────────┐
│  Generating Coefficients for │
│ Multiple transform Levels Using│
│     a Forward Transform      │
│             401              │
└─────────────────────────────┘
              │
              ▼
┌─────────────────────────────┐
│ Assigning Low Pass Coefficients to │
│ the Foreground, the Background, or │
│   a Value Indicative of a State in │
│  Which the Processing Logic is    │
│ Undecided in its Assignment       │
│ Between the Foreground or the     │
│          Background               │
│             402                   │
└─────────────────────────────┘
```

FIG. 4

Computing Low-pass Coefficients of the Foreground Classified Values and Background Classified Values for Multiple Transform Levels
701

Computing Inverse Values of the Low-pass Coefficients Corresponding to Foreground and Background Based on Numbers of Pixels in Groups of the Pixels in the Preliminary Mask Previously Classified as Foreground, Background and Undecided
702

FIG. 7

Using a Value That Results From Performing the Inverse Redundant Haar Wavelet Smooth Reconstruction in Which All High-pass Coefficients Are Set 0 When All Four Input Values Are Classified as Foreground
1001

Using a Value That is an Average of the Input Values Classified as Foreground as the Inverse Transform Value If Only One to Three Input Values Are Classified as Foreground
1002

Using a New Value if None of the Input Values are Classified as Foreground
1003

FIG. 10

| | | | | | | | | | | | |
|---|---|---|---|---|---|---|---|---|---|---|---|
| Level 3 Low-pass Coefficients | $c^3_{-2}$ | $c^3_{-1}$ | $c^3_0$ | $c^3_1$ | $c^3_2$ | $c^3_3$ | $c^3_4$ | $c^3_5$ | $c^3_6$ | $c^3_7$ | $c^3_8$ | $c^3_9$ |
| Level 2 Low-pass Coefficients | $c^2_{-2}$ | $c^2_{-1}$ | $c^2_0$ | $c^2_1$ | $c^2_2$ | $c^2_3$ | $c^2_4$ | $c^2_5$ | $c^2_6$ | $c^2_7$ | $c^2_8$ | $c^2_9$ |
| Level 1 Low-pass Coefficients | | $c^1_{-1}$ | $c^1_0$ | $c^1_1$ | $c^1_2$ | $c^1_3$ | $c^1_4$ | $c^1_5$ | $c^1_6$ | $c^1_7$ | $c^1_8$ | $c^1_9$ |
| Input | | | $x_0$ | $x_1$ | $x_2$ | $x_3$ | $x_4$ | $x_5$ | $x_6$ | $x_7$ | $x_8$ | $x_9$ |

FIG. 14

| | | | | | | | | | | | | | | | |
|---|---|---|---|---|---|---|---|---|---|---|---|---|---|---|---|
| $x$ | 7 | 42 | 63 | 79 | 90 | 112 | 127 | 151 | 162 | 207 | 216 | 241 | 35 | 240 | 234 |
| $c^1$ | 24 | 52 | 71 | 84 | 101 | 119 | 139 | 156 | 184 | 211 | 228 | 138 | 137 | 237 | 224 |
| $c^2$ | 47 | 68 | 86 | 101 | 120 | 137 | 161 | 183 | 206 | 174 | 182 | 187 | 180 | 180 | 179 |
| $c^3$ | 83 | 102 | 123 | 142 | 163 | 155 | 171 | 185 | 193 | 177 | 180 | 180 | 176 | 176 | 176 |
| $\lvert c^3_i - c^3_{i+8} \rvert$ | 110 | 75 | 57 | 38 | 13 | 21 | 5 | 10 | 15 | 2 | 34 | 56 | 78 | 81 | 109 |
| $c^3_f$ | 83 | 102 | 123 | 142 | 120 | 137 | 161 | 183 | 206 | 174 | 146 | 124 | 98 | 95 | 67 |
| $c^3_b$ | 193 | 177 | 180 | 180 | 120 | 137 | 161 | 183 | 206 | 174 | 180 | 180 | 176 | 176 | 176 |
| $\lvert c^2_i - c^2_{i+4} \rvert$ | --- | --- | --- | --- | 86 | 37 | 21 | 4 | --- | --- | --- | --- | --- | --- | --- |
| $c^2_f$ | 83 | 102 | 123 | 142 | 120 | 137 | 161 | 183 | 163 | 155 | 153 | 153 | 152 | 134 | 106 |
| $c^2_b$ | 193 | 177 | 180 | 180 | 206 | 174 | 161 | 183 | 163 | 155 | 170 | 181 | 191 | 175 | 178 |
| $\lvert c^1_i - c^1_{i+2} \rvert$ | --- | --- | --- | --- | --- | --- | 72 | 72 | --- | --- | --- | --- | --- | --- | --- |
| $c^1_f$ | 83 | 102 | 103 | 122 | 121 | 139 | 139 | 156 | 162 | 169 | 158 | 154 | 152 | 143 | 129 |
| $c^1_b$ | 193 | 177 | 186 | 178 | 193 | 177 | 139 | 156 | 162 | 169 | 166 | 168 | 180 | 178 | 184 |
| $x_f$ | 83 | 92 | 102 | 112 | 121 | 130 | 139 | 147 | 159 | 165 | 163 | 156 | 153 | 147 | 136 |
| $x_b$ | 193 | 185 | 181 | 182 | 185 | 185 | 158 | 147 | 159 | 165 | 167 | 167 | 174 | 179 | 181 |
| $\lvert x_f - x_b \rvert$ | 110 | 93 | 79 | 70 | 64 | 55 | 19 | 0 | 0 | 0 | 4 | 11 | 21 | 32 | 45 |
| $\tilde{m}_i$ | -1 | -1 | -1 | -1 | -1 | 0 | 0 | 0 | 0 | 0 | 0 | 0 | 0 | 0 | 0 |
| $c'^1_f$ | 24 | 52 | 71 | 84 | 90 | --- | --- | --- | --- | --- | --- | --- | --- | --- | --- |
| $c'^1_b$ | --- | --- | --- | --- | --- | --- | --- | --- | --- | --- | --- | --- | --- | --- | --- |
| $c'^2_f$ | 47 | 68 | 86 | 84 | 90 | --- | --- | --- | --- | --- | --- | --- | --- | 33 | 33 |
| $c'^2_b$ | --- | --- | --- | --- | --- | --- | --- | --- | --- | --- | --- | --- | --- | --- | 238 |
| $c'^3_f$ | 83 | 68 | 68 | 84 | 90 | --- | --- | --- | --- | 33 | 33 | 33 | 33 | 34 | 34 |
| $c'^3_b$ | --- | --- | --- | --- | --- | --- | --- | --- | --- | --- | 238 | 223 | 172 | 173 | 176 |

FIG. 16A  FIG. 16B →

| | | | | | | | | | | | | | | | | | | |
|---|---|---|---|---|---|---|---|---|---|---|---|---|---|---|---|---|---|---|
| $x$ | 215 | 33 | 238 | 208 | 212 | 35 | 240 | 226 | 240 | 5 | 9 | 30 | 1 | 15 | 12 | 36 | 35 | 17 | 22 |
| $c^1$ | 124 | 135 | 223 | 210 | 123 | 137 | 233 | 233 | 122 | 7 | 19 | 15 | 8 | 13 | 24 | 35 | 26 | 19 | 22 |
| $c^2$ | 173 | 172 | 173 | 173 | 178 | 185 | 177 | 120 | 70 | 11 | 13 | 14 | 16 | 24 | 25 | 27 | 24 | 19 | 22 |
| $c^3$ | 175 | 178 | 175 | 146 | 124 | 98 | 95 | 67 | 43 | 17 | 19 | 20 | 20 | 21 | 23 | 27 | 24 | 19 | 22 |
| $|c^3_i - c^3_{i+8}|$ | 132 | 161 | 156 | 126 | 104 | 77 | 72 | 40 | 19 | 2 | 3 | 0 | 0 | 0 | 0 | 0 | 0 | 0 | 0 |
| $c^3_f$ | 43 | 17 | 19 | 20 | 20 | 21 | 23 | 27 | 70 | 11 | 13 | 14 | 16 | 24 | 25 | 27 | 24 | 19 | 22 |
| $c^3_b$ | 175 | 178 | 175 | 146 | 124 | 98 | 95 | 67 | 70 | 11 | 13 | 14 | 16 | 24 | 25 | 27 | 24 | 19 | 22 |
| $|c^2_i - c^2_{i+4}|$ | --- | --- | --- | --- | --- | --- | --- | --- | --- | --- | --- | --- | --- | --- | --- | --- | 0 | 0 | 0 |
| $c^2_f$ | 83 | 57 | 57 | 43 | 31 | 19 | 21 | 23 | 45 | 16 | 18 | 20 | 43 | 17 | 19 | 20 | 20 | 21 | 23 |
| $c^2_b$ | 177 | 177 | 175 | 161 | 149 | 138 | 135 | 106 | 97 | 54 | 54 | 40 | 43 | 17 | 19 | 20 | 20 | 21 | 23 |
| $|c^1_i - c^1_{i+2}|$ | --- | --- | --- | --- | --- | --- | --- | --- | --- | --- | --- | --- | --- | --- | --- | --- | 0 | 0 | 0 |
| $c^1_f$ | 108 | 81 | 70 | 50 | 44 | 31 | 26 | 21 | 33 | 19 | 31 | 18 | 30 | 18 | 31 | 18 | 19 | 20 | 21 |
| $c^1_b$ | 176 | 177 | 176 | 169 | 162 | 149 | 142 | 122 | 116 | 80 | 75 | 47 | 48 | 28 | 31 | 18 | 19 | 20 | 21 |
| $x_f$ | 118 | 94 | 75 | 60 | 47 | 37 | 28 | 23 | 27 | 26 | 25 | 24 | 24 | 24 | 24 | 24 | 18 | 19 | 20 |
| $x_b$ | 180 | 176 | 176 | 172 | 165 | 155 | 145 | 132 | 119 | 98 | 77 | 61 | 47 | 38 | 29 | 24 | 18 | 19 | 20 |
| $|x_f - x_b|$ | 62 | 82 | 101 | 112 | 118 | 118 | 117 | 109 | 92 | 72 | 52 | 37 | 23 | 14 | 5 | 0 | 0 | 0 | 0 |
| $\tilde{m}_i$ | 0 | -1 | 1 | 1 | 1 | -1 | 1 | 1 | 1 | -1 | 0 | 0 | 0 | 0 | 0 | 0 | 0 | 0 | 0 |
| $c'^1_f$ | 33 | 33 | --- | --- | 35 | 35 | --- | --- | 5 | 5 | --- | --- | --- | --- | --- | --- | --- | --- | --- |
| $c'^1_b$ | --- | 238 | 223 | 210 | 212 | 240 | 233 | 122 | 240 | --- | --- | --- | --- | --- | --- | --- | --- | --- | --- |
| $c'^2_f$ | 33 | 33 | 35 | 35 | 35 | 35 | 5 | 5 | 5 | 5 | --- | --- | --- | --- | --- | --- | --- | --- | --- |
| $c'^2_b$ | 223 | 172 | 173 | 173 | 178 | 185 | 177 | --- | --- | --- | --- | --- | --- | --- | --- | --- | --- | --- | --- |
| $c'^3_f$ | 34 | 34 | 20 | 20 | 20 | 30 | 5 | 5 | 5 | 5 | --- | --- | --- | --- | --- | --- | --- | --- | --- |
| $c'^3_b$ | 175 | 178 | 125 | 146 | 124 | 185 | 177 | 128 | 240 | --- | --- | --- | --- | --- | --- | --- | --- | --- | --- |

← FIG. 16A    FIG. 16B

| $\tilde{m}_j$ | -1 | -1 | -1 | -1 | -1 | 0 | 0 | 0 | 0 | 0 | 0 | 0 | 0 | 0 | 0 | 0 | -1 |
|---|---|---|---|---|---|---|---|---|---|---|---|---|---|---|---|---|---|
| $c'^1_f$ | 24 | 52 | 71 | 84 | 90 | --- | --- | --- | --- | --- | --- | --- | --- | --- | --- | 33 | 33 |
| $c'^1_b$ | --- | --- | --- | --- | --- | --- | --- | --- | --- | --- | --- | --- | --- | --- | --- | --- | 238 |
| $c'^2_f$ | 47 | 68 | 86 | 84 | 90 | --- | --- | --- | --- | --- | --- | --- | --- | 33 | 33 | 33 | 33 |
| $c'^2_b$ | --- | --- | --- | --- | --- | --- | --- | --- | --- | --- | --- | --- | --- | --- | 238 | 223 | 172 |
| $c'^3_f$ | 83 | 68 | 68 | 84 | 90 | --- | --- | --- | --- | 33 | 33 | 33 | 33 | 34 | 34 | 34 | 34 |
| $c'^3_b$ | --- | --- | --- | --- | --- | --- | --- | --- | --- | --- | 238 | 223 | 172 | 173 | 176 | 175 | 178 |
| $c'^2_f$ | 47 | 68 | 68 | 84 | 87 | 68 | 68 | 84 | 90 | 33 | 33 | 33 | 33 | 33 | 33 | 33 | 33 |
| $c'^2_b$ | 255 | 255 | 255 | 101 | 120 | 137 | 161 | 183 | 206 | 174 | 238 | 223 | 172 | 173 | 157 | 199 | 175 |
| $c'^1_f$ | 47 | 68 | 57 | 76 | 77 | 76 | 77 | 76 | 79 | 58 | 61 | 33 | 33 | 33 | 33 | 33 | 33 |
| $c'^1_b$ | 255 | 255 | 255 | 178 | 187 | 119 | 140 | 160 | 183 | 178 | 222 | 198 | 205 | 198 | 164 | 186 | 166 |
| $c'_f$ | 47 | 57 | 62 | 66 | 76 | 76 | 76 | 76 | 77 | 68 | 59 | 47 | 33 | 33 | 33 | 33 | 33 |
| $c'_b$ | 255 | 255 | 255 | 216 | 182 | 153 | 129 | 150 | 171 | 180 | 200 | 210 | 201 | 201 | 181 | 175 | 176 |
| $\|x'_f - x'_b\|$ | 208 | 198 | 193 | 150 | 106 | 77 | 53 | 74 | 94 | 112 | 141 | 163 | 168 | 168 | 148 | 142 | 143 |
| m | 1 | 1 | 1 | 1 | 1 | 1 | 0 | 0 | 0 | 0 | 0 | 0 | 1 | 0 | 0 | 0 | 1 |
| $x''_f$ | 7 | 42 | 63 | 79 | 90 | 112 | 76 | 76 | 77 | 68 | 59 | 47 | 35 | 33 | 33 | 33 | 33 |
| $x''_b$ | 255 | 255 | 255 | 216 | 182 | 153 | 127 | 151 | 162 | 207 | 216 | 241 | 201 | 240 | 234 | 215 | 176 |

FIG. 17A  FIG. 17B →

| $\tilde{m}_j$ | 1 | 1 | 1 | -1 | 1 | 1 | 1 | -1 | 0 | 0 | 0 | 0 | 0 | 0 | 0 | 0 |
|---|---|---|---|---|---|---|---|---|---|---|---|---|---|---|---|---|
| $c'^1_f$ | --- | --- | 35 | 35 | --- | --- | 5 | 5 | --- | --- | --- | --- | --- | --- | --- | --- |
| $c'^1_b$ | 223 | 210 | 212 | 240 | 233 | 122 | 240 | --- | --- | --- | --- | --- | --- | --- | --- | --- |
| $c'^2_f$ | 35 | 35 | 35 | 35 | 5 | 5 | 5 | 5 | --- | --- | --- | --- | --- | --- | --- | --- |
| $c'^2_b$ | 173 | 173 | 178 | 185 | 177 | --- | --- | --- | --- | --- | --- | --- | --- | --- | --- | --- |
| $c'^3_f$ | 20 | 20 | 20 | 30 | 5 | 5 | 5 | 5 | --- | --- | --- | --- | --- | --- | --- | --- |
| $c'^3_b$ | 125 | 146 | 124 | 185 | 177 | 128 | 240 | --- | --- | --- | --- | --- | --- | --- | --- | --- |
| $c'^2_f$ | 27 | 27 | 27 | 32 | 12 | 12 | 12 | 17 | 5 | 5 | 5 | 5 | 25 | 27 | 24 | 19 | 22 |
| $c'^2_b$ | 149 | 161 | 149 | 181 | 151 | 137 | 182 | 185 | 177 | 128 | 240 | 255 | 255 | 255 | 255 | 255 |
| $c'^1_f$ | 30 | 30 | 27 | 29 | 19 | 22 | 12 | 14 | 8 | 11 | 5 | 5 | 15 | 16 | 24 | 23 | 23 |
| $c'^1_b$ | 174 | 168 | 149 | 171 | 150 | 159 | 166 | 161 | 179 | 156 | 208 | 191 | 247 | 255 | 255 | 255 |
| $c'_f$ | 31 | 30 | 28 | 28 | 24 | 20 | 17 | 13 | 11 | 9 | 8 | 5 | 10 | 15 | 20 | 23 | 23 |
| $c'_b$ | 170 | 171 | 158 | 160 | 160 | 154 | 162 | 163 | 170 | 167 | 182 | 199 | 219 | 251 | 255 | 255 | 255 |
| $|x'_f - x'_b|$ | 139 | 141 | 130 | 132 | 136 | 134 | 145 | 150 | 159 | 158 | 174 | 194 | 209 | 236 | 235 | 232 | 232 |
| m | 0 | 0 | 0 | 1 | 0 | 0 | 0 | 1 | 1 | 1 | 1 | 1 | 1 | 1 | 1 | 1 |
| $x''_f$ | 31 | 30 | 28 | 35 | 24 | 20 | 17 | 5 | 9 | 30 | 1 | 15 | 12 | 36 | 35 | 17 | 22 |
| $x''_b$ | 238 | 208 | 212 | 160 | 240 | 226 | 240 | 163 | 170 | 167 | 182 | 199 | 219 | 251 | 255 | 255 | 255 |

← FIG. 17A    FIG. 17B

| $m$ | 1 | 1 | 1 | 1 | 1 | 1 | 0 | 0 | 0 | 0 | 0 | 0 | 1 | 0 | 0 | 0 | 1 |
|---|---|---|---|---|---|---|---|---|---|---|---|---|---|---|---|---|---|
| $x''_f$ | 7 | 42 | 63 | 79 | 90 | 112 | --- | --- | --- | --- | --- | --- | 35 | --- | --- | --- | 33 |
| $c''^1_f$ | 24 | 52 | 71 | 84 | 101 | 112 | --- | --- | --- | --- | --- | 35 | 35 | --- | --- | 33 | 33 |
| $c''^2_f$ | 47 | 68 | 86 | 98 | 101 | 112 | --- | --- | --- | 35 | 35 | 35 | 35 | 33 | 33 | 33 | 33 |
| $c''^3_f$ | 74 | 90 | 86 | 98 | 101 | 73 | 35 | 35 | 35 | 34 | 34 | 34 | 34 | 34 | 34 | 34 | 34 |
| $c''^4_f$ | 54 | 62 | 60 | 66 | 67 | 53 | 34 | 34 | 34 | 27 | 27 | 28 | 28 | 21 | 22 | 24 | 25 |
| $c''^5_f$ | 39 | 40 | 40 | 43 | 44 | 34 | 26 | 26 | 26 | 23 | 23 | 24 | 24 | 22 | 24 | 24 | 22 |
| $\hat{c}''^4_f$ | 54 | 62 | 60 | 66 | 67 | 53 | 34 | 34 | 34 | 27 | 27 | 28 | 28 | 21 | 22 | 24 | 25 |
| $\hat{c}''^3_f$ | 74 | 90 | 86 | 98 | 101 | 73 | 35 | 35 | 35 | 34 | 34 | 34 | 34 | 34 | 34 | 34 | 34 |
| $\hat{c}''^2_f$ | 47 | 68 | 86 | 98 | 101 | 112 | 60 | 66 | 68 | 35 | 35 | 35 | 35 | 33 | 33 | 33 | 33 |
| $\hat{c}''^1_f$ | 24 | 52 | 71 | 84 | 101 | 112 | 80 | 89 | 64 | 50 | 51 | 35 | 35 | 34 | 34 | 33 | 33 |
| $\hat{x}_f$ | 7 | 42 | 63 | 79 | 90 | 112 | 96 | 84 | 76 | 57 | 50 | 43 | 35 | 34 | 34 | 33 | 33 |

| m | 0 | 0 | 0 | 1 | 0 | 0 | 0 | 1 | 1 | 1 | 1 | 1 | 1 | 1 | 1 | 1 |
|---|---|---|---|---|---|---|---|---|---|---|---|---|---|---|---|---|
| $x''_f$ | --- | --- | --- | 35 | --- | --- | --- | 5 | 9 | 30 | 1 | 15 | 12 | 36 | 35 | 17 | 22 |
| $c''^1_f$ | --- | --- | <u>35</u> | 35 | --- | --- | <u>5</u> | 7 | 19 | 15 | 8 | 13 | 24 | 35 | 26 | 19 | 22 |
| $c''^2_f$ | <u>35</u> | <u>35</u> | 35 | 35 | <u>5</u> | <u>7</u> | 12 | 11 | 13 | 14 | 16 | 24 | 25 | 27 | 24 | 19 | 22 |
| $c''^3_f$ | 20 | 21 | 23 | 23 | 9 | 10 | 14 | 17 | 19 | 20 | 20 | 21 | 23 | 27 | 24 | 19 | 22 |
| $c''^4_f$ | 19 | 20 | 21 | 22 | 16 | 18 | 19 | 18 | 20 | 20 | 20 | 21 | 23 | 27 | 24 | 19 | 22 |
| $c''^5_f$ | 20 | 20 | 21 | 22 | 16 | 18 | 19 | 18 | 20 | 20 | 20 | 21 | 23 | 27 | 24 | 19 | 22 |
| $\hat{c}''^4_f$ | 19 | 20 | 21 | 22 | 16 | 18 | 19 | 18 | 20 | 20 | 20 | 21 | 23 | 27 | 24 | 19 | 22 |
| $\hat{c}''^3_f$ | 20 | 21 | 23 | 23 | 9 | 10 | 14 | 17 | 19 | 20 | 20 | 21 | 23 | 27 | 24 | 19 | 22 |
| $\hat{c}''^2_f$ | <u>35</u> | <u>35</u> | 35 | 35 | <u>5</u> | <u>7</u> | 12 | 11 | 13 | 14 | 16 | 24 | 25 | 27 | 24 | 19 | 22 |
| $\hat{c}''^1_f$ | 34 | 34 | <u>35</u> | 35 | 20 | 21 | <u>5</u> | 7 | 19 | 15 | 8 | 13 | 24 | 35 | 26 | 19 | 22 |
| $\hat{x}_f$ | 33 | 34 | 34 | <u>35</u> | 27 | 20 | 13 | <u>5</u> | <u>9</u> | <u>30</u> | <u>1</u> | <u>15</u> | <u>12</u> | <u>36</u> | <u>35</u> | <u>17</u> | <u>22</u> |

| | | | | | | | | | | | | | | | | | |
|---|---|---|---|---|---|---|---|---|---|---|---|---|---|---|---|---|---|
| m | 1 | 1 | 1 | 1 | 1 | 1 | 0 | 0 | 0 | 0 | 0 | 0 | 1 | 0 | 0 | 0 | 1 |
| $x''_b$ | --- | --- | --- | --- | --- | --- | 127 | 151 | 162 | 207 | 216 | 241 | --- | 240 | 234 | 215 | --- |
| $c''^1_b$ | --- | --- | --- | --- | --- | 127 | 139 | 156 | 184 | 211 | 228 | 241 | 240 | 237 | 224 | 215 | 238 |
| $c''^2_b$ | --- | --- | --- | 127 | 139 | 141 | 161 | 183 | 206 | 226 | 234 | 239 | 232 | 226 | 231 | 219 | 224 |
| $c''^3_b$ | 139 | 141 | 161 | 155 | 172 | 183 | 197 | 211 | 219 | 226 | 232 | 229 | 228 | 221 | 228 | 220 | 230 |
| $c''^4_b$ | 179 | 183 | 196 | 192 | 200 | 202 | 212 | 215 | 224 | 226 | 230 | 230 | 232 | 228 | 230 | 230 | 230 |
| $c''^5_b$ | 204 | 204 | 212 | 211 | 218 | 219 | 222 | 227 | 224 | 226 | 230 | 230 | 232 | 228 | 230 | 230 | 230 |
| $\hat{c}''^4_b$ | 179 | 183 | 196 | 192 | 200 | 202 | 212 | 215 | 224 | 226 | 230 | 230 | 232 | 228 | 230 | 230 | 230 |
| $\hat{c}''^3_b$ | 139 | 141 | 161 | 155 | 172 | 183 | 197 | 211 | 219 | 226 | 232 | 229 | 228 | 221 | 228 | 220 | 230 |
| $\hat{c}''^2_b$ | 139 | 141 | 161 | 127 | 139 | 141 | 161 | 183 | 206 | 226 | 234 | 239 | 232 | 226 | 231 | 219 | 224 |
| $\hat{c}''^1_b$ | 139 | 141 | 150 | 134 | 150 | 127 | 139 | 156 | 184 | 211 | 228 | 241 | 240 | 237 | 224 | 215 | 238 |
| $\hat{x}_b$ | 139 | 140 | 145 | 142 | 142 | 138 | 127 | 151 | 162 | 207 | 216 | 241 | 240 | 240 | 234 | 215 | 226 |

FIG. 19A  FIG. 19B →

| m | 0 | 0 | 0 | 1 | 0 | 0 | 0 | 1 | 1 | 1 | 1 | 1 | 1 | 1 | 1 | 1 | 1 |
|---|---|---|---|---|---|---|---|---|---|---|---|---|---|---|---|---|---|
| $x''_b$ | 238 | 208 | 212 | --- | 240 | 226 | 240 | --- | --- | --- | --- | --- | --- | --- | --- | --- | --- |
| $c''^1_b$ | 223 | 210 | 212 | <u>240</u> | 233 | 233 | 240 | --- | --- | --- | --- | --- | --- | --- | --- | --- | --- |
| $c''^2_b$ | 217 | 225 | 222 | 236 | 236 | 233 | 240 | --- | --- | --- | --- | --- | --- | --- | --- | --- | --- |
| $c''^3_b$ | 226 | 229 | 231 | 236 | 236 | 233 | 240 | --- | --- | --- | --- | --- | --- | --- | --- | --- | --- |
| $c''^4_b$ | 226 | 229 | 231 | 236 | 236 | 233 | 240 | --- | --- | --- | --- | --- | --- | --- | --- | --- | --- |
| $c''^5_b$ | 226 | 229 | 231 | 236 | 236 | 233 | 240 | --- | --- | --- | --- | --- | --- | --- | --- | --- | --- |
| $\hat{c}''^4_b$ | 226 | 229 | 231 | 236 | 236 | 233 | 240 | <u>224</u> | <u>226</u> | <u>230</u> | <u>230</u> | <u>232</u> | <u>228</u> | <u>230</u> | <u>230</u> | <u>230</u> | <u>226</u> |
| $\hat{c}''^3_b$ | 226 | 229 | 231 | 236 | 236 | 233 | 240 | 227 | 226 | 229 | 230 | 234 | 232 | 231 | 235 | 227 | 226 |
| $\hat{c}''^2_b$ | 217 | 225 | 222 | 236 | 236 | 233 | 240 | 231 | 231 | 231 | 235 | 230 | 229 | 230 | 232 | 230 | 229 |
| $\hat{c}''^1_b$ | 223 | 210 | 212 | <u>240</u> | 233 | 233 | 240 | 232 | 235 | 231 | 233 | 230 | 232 | 230 | 230 | 230 | 230 |
| $\hat{x}_b$ | 238 | <u>208</u> | <u>212</u> | 226 | <u>240</u> | <u>226</u> | <u>240</u> | 236 | 233 | 233 | 232 | 231 | 231 | 231 | 230 | 230 | 230 |

← FIG. 19A      FIG. 19B

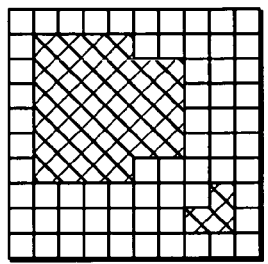
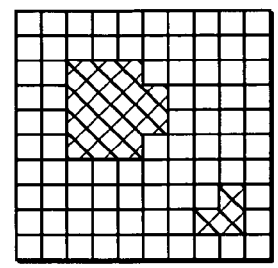
Mask
Crosshatched Locations are Foreground (Background)
Locations Not Crosshatched are "Don't Care" for Strict Foreground (Background)
"Don't Care" Locations (Not Crosshatched) for Lossy Edge Foreground (Background) for 4-connected Neighborhood
FIG. 20

|  |  |  |  |  |  |  |  |  |  |
|---|---|---|---|---|---|---|---|---|---|
|  | 0.25 | 0.25 | 0.25 | 0.25 |  |  |  |  |  |
|  | 0.25 | 1 | 1 | 1 | 0.25 | 0.25 |  |  |  |
|  | 0.25 | 1 | 1 | 1 | 1 | 0.25 |  |  |  |
|  | 0.25 | 1 | 1 | 1 | 1 | 0.25 |  |  |  |
|  | 0.25 | 1 | 1 | 1 | 0.25 | 0.25 |  |  |  |
|  | 0.25 | 0.25 | 0.25 | 0.25 |  |  |  |  |  |
|  |  |  |  |  |  |  |  | 0.25 |  |
|  |  |  |  |  |  |  | 0.25 | 0.25 |  |
|  |  |  |  |  |  |  |  |  |  |

FIG. 23

MULTI-RESOLUTION SEGMENTATION AND FILL

FIELD OF THE INVENTION

The present invention relates to the field of image processing, more particularly, the present invention relates to segmentation and data filling of images.

BACKGROUND OF THE INVENTION

JPM, JPEG 2000 Part 6, is a Mixed Raster Content (MRC) file format. MRC is a method for compressing compound images containing both binary text and continuous-tone images. MRC uses a multi-layered imaging model for representing the results of multiple compression algorithms, including ones developed specifically for text and for images. In JPM, images are compressed by decomposing them into layers that are composited with a mask. Images after decomposition and masks are compressed with appropriate standardized image compressors such as JPEG, JPEG 2000, JBIG, MMR. For more information on JPM and the MRC file format, see "Information Technology—JPEG 2000 Image Coding Standard—Part 6: Compound Image File Format," ISO/IEC FDIS 15444-6; Boliek & Wu, "JPEG 2000-like Access Using the JPM Compound Document File Format," ICME 2003 Proceedings, 2003 International Conference on Multimedia and Expo, Vol. 1, 6-9 Jul. 2003; de Queiroz, Buckley & Xu, "Mixed Raster Content (MRC) Model for Compound Image Compression," Proc. IS&T/SPIE Symp. on Electronic Imaging, Visual Communications and Image Processing, San Jose, Calif., SPIE Vol. 3653, pp. 1106-1117, February 1999.

A JPM file may have any number of composited layers. A JPM encoder creates the data that is stored according to the JPM file format. Such an encoder typically includes a continuous-tone compressor for compressing continuous tone images corresponding to background and foreground images and a binary image compressor for compressing masks.

In the prior art, binarization of images is performed as a pre-processing operation for optical character recognition (OCR). For example, see "Comparison of Some Thresholding Algorithms for Text/Background Segmentation in Difficult Document Images, ICDAR 2003: Proceedings of International Conference on Document Analysis and Recognition, Vol. 2, pp. 859-863, 2003, Leedham et al.

Two important functions of the JPM encoder are not standardized. These include segmentation and data filling. Segmentation refers to how to decompose the image into foreground and background layers and create the mask, while data filling indicates how to assign values to "don't care" pixels in the foreground and background images (pixels of a layer that are not used when compositing the final image using the mask) so that the foreground and background images compress well.

A number of segmentation and data filling techniques exist in the prior art. For example, many of the prior art segmentation methods use K-means clustering in the spatial domain for image processing, with many of the prior art methods being block based. K-means clustering uses the number of times each color occurs, but not the spatial relationship of the colors. Page segmentation has been done in scale space based on a morphological transform. For example, see D. P. Mukherjee and S. T. Acton, "Document page segmentation using multiscale clustering," Proc. IEEE Int. Conf. On Image Processing, Kobe, Japan, Oct. 25-29, 1999.

U.S. Pat. No. 6,633,670 discloses foreground/background segmentation on blocks of two different sizes and uses values from the maximum gradient for clustering instead of iterative k-means.

The prior art includes multi-scale methods for segmentation that do not involve multi-resolution transforms such as, for example, using different block sizes for grouping pixels and computing probabilities of using Markov chains across scales. For example, in Zhao Jian, et al., "A New Wavelet-Based Document Image Segmentation Scheme," Journal of Systems Engineering and Electronics, vol. 13, no. 3, 2002, pp. 86-90, multiple block sizes are used, and a single transform level of the critically sampled (not redundant) Haar transform is used.

Adaptive filtering, diffusion based on edges and grayscale morphology is well known. There are non-MRC compression methods for compound documents. For example, Guo et. al., "Compound Image Compression Using Adaptive Wavelet Transform," Journal of the Institute of Image Electronics Engineers of Japan, vol. 30, no. 2, pp. 138-50, discloses the use of an adaptive wavelet transform (5,3 wavelet and lifting based transform for binary data) based on a segmentation.

DjVu refers to a product developed in conjunction between AT&T and Lizard Tech. In DjVu, foreground/background segmentation is performed using a weighted average of K-means clustering on blocks of varying sizes. Filling is performed by iteration using the compression (critically sampled, longer filter than Haar) wavelet system. For more information on DjVu, see Bottou, et al., "High Quality Document Image Compression with DjVu," Journal of Electronic Imaging, vol. 7, no. 3, pp. 410-425, SPIE, 1998.

Some of the prior art methods in these areas are designed to capture fine scale detail such as halftone-noise. Xerox has used MRC. For example, for images of colored engravings, a combination of K-means segmentation and adaptive region-based thresholding is followed by artifact cleaning. For more information, see Misic, Buckley & Parker, "Encoding and Processing of Color Engravings (Using MRC)," 2002 IEEE International Conference on Image Processing, Rochester, N.Y., Sep. 22-25, 2002. One disclosed method is a multiple step method with an initial mask and a final mask, with a goal to keep the structure of the printing process (such as halftoning noise) in the mask, and not reject it.

In one prior art reference, a block-based segmentation method is disclosed in which a threshold value is chosen for each block to separate the background and the foreground. For more information, see de Queiroz, Fan & Tran, "Optimizing block-thresholding segmentation for MRC compression," Proc. IEEE Intl. Conf. on Image Processing, ICIP, Vancouver, Canada, Vol. II, pp. 597-600, September 2000. For grayscale and N×N blocks, there are at most $N^2$ possible values for the threshold. For 8×8 blocks, such as those used by JPEG, searching at most 64 threshold values can be done to find the best threshold. See, for example, U.S. Pat. No. 6,373,981. Furthermore, U.S. Pat. No. 6,400,844 discloses the use a simple threshold on blocks for foreground/background segmentation and has other classification methods to decide to do foreground/background segmentation on a block or not.

There are several fill methods that have been employed in the prior art. For example, one such fill technique includes performing a fill by averaging non-don't-care pixels that form a four-neighborhood in multiple passes until all don't cares are filled. See de Queiroz, "On data-filling algorithms for MRC layers," Proc. IEEE Intl. Conf. on Image Processing, ICIP, Vancouver, Canada, Vol. II, pp. 586-589, September 2000. Another prior art fill method includes performing a fill by using a low pass filter and exaggerating the coefficients for positions that are not "don't care." Still another prior art fill method includes fill by iteration using a DCT. There are several related U.S. Patents. For example, see U.S. Pat. Nos. 6,334,001, 6,272,255, and 6,275,620.

A segmentation and fill method is disclosed in Mukherjee et al., "JPEG2000-Matched MRC Compression of Compound Documents," 2002 IEEE International Conference on Image Processing, Rochester, N.Y., Sep. 22-25, 2002. In the disclosed method, processing is performed in stripes, with segmentation being done on blocks and occurring in one pass. High contrast blocks are segmented by intensity into background (lighter) and (darker) foreground with K-means. Low contrast blocks are assigned based on the neighboring blocks.

LuraDocument is a JPM related product that performs foreground/background segmentation and fill from LuraTech (http://www.luratech.com/, Algo Vision LuraTech GmbH), which is similar to JPM but not standardized, is described in EPO patent no. EP 1 104 916 A1 (in German); Thierschmann et al., "A Scalable DSP Architecture For High-Speed Color Document Compression," Document Recognition and Retrieval VIII; and Kantor, et al., Editors, Proceedings of SPIE Vol. 4307 (2001), San Jose, Calif., January 2001. LuraDocument creates an adaptive threshold for binarization. On a 75 dpi reduced resolution, 3×3 minimum and 3×3 maximum filters are applied and their difference is computed. If the difference is less than a fixed parameter, the threshold is initially "don't care;" otherwise, it is initially the average of the minimum and maximum. The initial threshold values that are not "don't care" are filtered with a 3×3 averaging filter and then further propagated with a 5×5 averaging filter. "Don't care" threshold values are assigned using a 7×7 filter that averages all values that are not "don't care". The threshold values are interpolated to the full image resolution with bilinear interpolation. The threshold values are then compared with the original image to generate a binary image.

LuraDocument does text detection by finding connected components in the binary image of sizes within limits based on the document resolution. For each connected component, it is classified as text if its internal variance is below a threshold and has strong edges based on Sobel and Laplace filters. Text connected components are set as foreground in the mask, and other locations are set as background.

LuraDocument generates a foreground image that is reduced in resolution by a factor of 3 in each dimension. The mask is thinned by one pixel to select non-border foreground pixels versus "don't care" pixels. For each 3×3 block, pixels that are not "don't care" are averaged and 3×3 blocks with 9 "don't care" pixels are labeled as "don't care". A 5×5 averaging filter is used to propagate average values to "don't care" values. Another 5×5 averaging filter is used to damp the foreground color in non-text regions towards gray. The background is computed in a similar fashion.

Fill and segmentation operations have been used in check image compression. For example, a complete system for checks (using in banking) is described in Huang, et al., "Check image compression using a layered coding method," Journal of Electronic Imaging, 7(3), pp. 426-442, July 1998, in which the system uses grayscale morphological closing as the key operation for segmentation. The system determines the size (scale/resolution) for the structuring element independently for small blocks, performs removal of isolated pixels, and performs fill using averaging.

SUMMARY OF THE INVENTION

A multi-resolution segmentation and fill method and apparatus is disclosed. In one embodiment, the method comprises generating a plurality of layers using image data from multiple resolutions, generating a mask describing compositing of the plurality of layers to obtain the image, and filling pixels in each of the plurality of layers where the pixels being filled are those that do not contribute to the image when the plurality of layers are composited.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a flow diagram of one embodiment of a process for performing multi-resolution foreground/background analysis;

FIG. 7 is a flow diagram of one embodiment of a process for performing multi-resolution foreground and background generation;

FIG. 10 is a flow diagram of one embodiment of a process for propagating foreground classified values;

FIG. 14 shows an input and the low pass coefficients for 3 transform levels;

FIG. 16 shows a numerical example for a 1-dimension signal;

FIG. 17 continues an example by repeating selected operations;

FIG. 18 illustrates one operation for the foreground;

FIG. 19 illustrates one operation for the background;

FIG. 20 illustrates a 2D lossy edge;

FIG. 23 illustrates exemplary weights with intermediate values for use in a lossy edge filling.

DETAILED DESCRIPTION OF THE PRESENT INVENTION

Figure 1:
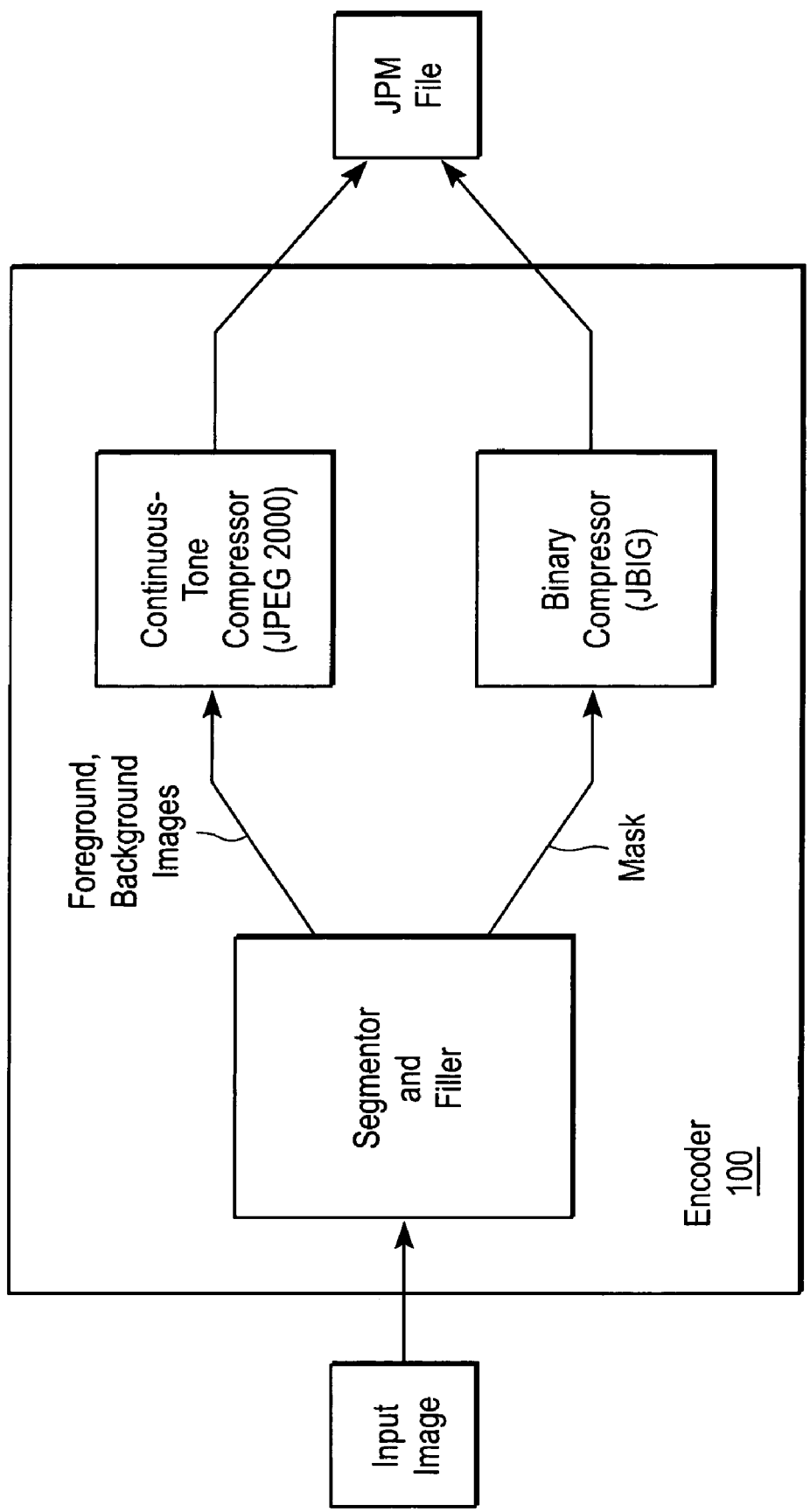
FIG. 1 is a block diagram of an encoder.

Multi-resolution foreground and background segmentation and fill techniques are disclosed. In one embodiment, these techniques are combined together as part of an image processing process (e.g., creating a JPM file). In one embodiment, the foreground and background segmentation and fill technique is given one input image and produces a foreground image, a background image and a binary mask image. The segmentation technique determines the value of the binary mask image, while the fill algorithm determines the value of the filled ("don't care") pixels in each of the two image layers. In one embodiment, at pixel locations where the binary mask is a 1, the foreground image has the same value as the original image and the background is a "don't care" value that needs to be filled, and where the binary mask is 0, the background is the same as the original image and the foreground is a "don't care" value that needs to be filled. If the foreground, background and mask images are not quantized, the original image can be recovered losslessly by compositing the foreground and background images using the mask.

The segmentation described herein is performed in a multi-resolution fashion. In one embodiment, the multi-resolution segmentation is achieved through the application of a wavelet transform (e.g., a redundant Haar wavelet transform) to image data and coefficients.

There are a number of differences between the segmentation and fill techniques described herein and the prior art. For example, the classification (creation of mask) with a linear filtering/redundant wavelet transform based method and the use of a redundant wavelet data flow and averaging method for combining different phases is not found in the prior art. Moreover, the ability to perform foreground and background segmentation of scanned halftoned ignoring halftone noise is one benefit over prior art methods.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of an encoder. Referring to FIG. 1, an example of a JPM-based system having a segmentator and filler that decomposes an original image into one background image, one foreground image and one mask. Each of these may then be compressed. The background and foreground images are compressed using a continuous-tone compressor (e.g., JPEG 2000 compressor), while the mask is compressed using a binary image compressor (e.g., a JBIG or JBIG2 compressor). By combining state of the art continuous-tone and binary image compressors, JPM can provide better compression performance for compound document images than current continuous-tone or binary image compression methods alone.

Figure 2:
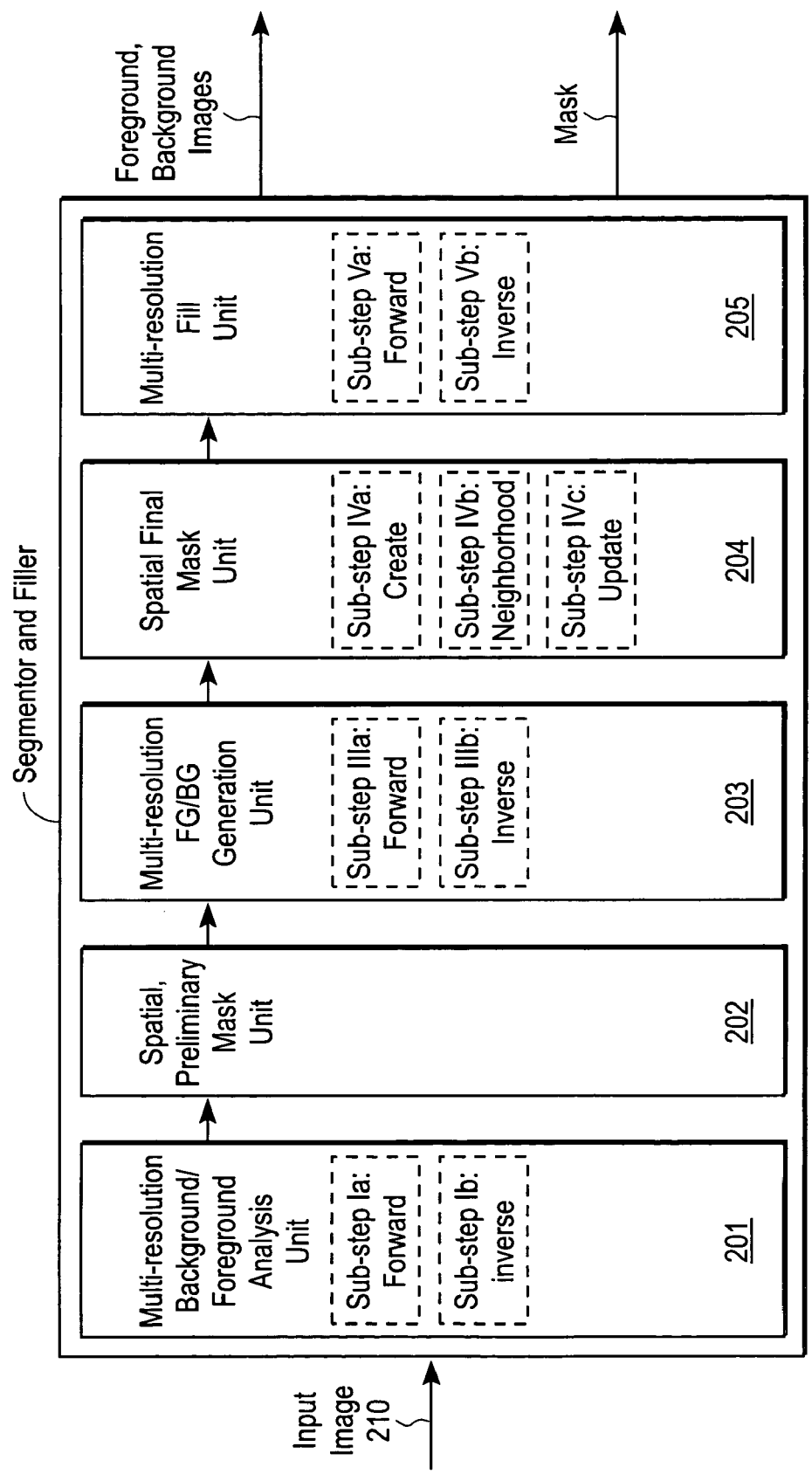
FIG. 2 is block diagram of one embodiment of a segmentor and filler that may be used to perform the multi-resolution segmentation and fill techniques.

FIG. 2 is block diagram of one embodiment of a segmentor and filler that may be used to perform the multi-resolution segmentation and fill techniques described herein. In one embodiment, the segmentation and fill may be performed using the redundant Haar wavelet transform. In one embodiment, the method uses three operations with multi-resolution transforms that have the same memory access pattern as the redundant Haar wavelet transform.

Referring to FIG. 2, multi-resolution foreground/background analysis processing unit 201 performs operations associated with multi-resolution foreground/background analysis (referred to herein as Step I) on input image 210, spatial preliminary mask processing unit 202 performs operations associated with generation of a spatial preliminary mask (referred to herein as Step II), multi-resolution foreground and background processing unit 203 performs operations associated with multi-resolution foreground/background generation (referred to herein as Step III), spatial final mask processing unit 204 performs operations associated with the generation of a spatial final mask (referred to herein as Step IV), and multi-resolution fill processing unit 205 performs operations associated with performing a multi-resolution fill operation (referred to herein as Step V). The inputs of multi-resolution fill unit are the mask and the foreground and background images.

Some of the multi-resolution operations (Steps I, III and V) have a "forward" part (Sub-steps Ia, IIIa, Va) and an "inverse" part (Sub-steps Ib, IIIb and Vb). Step IV also has several sub-operations. Descriptions of these operations follow.

Figure 3:
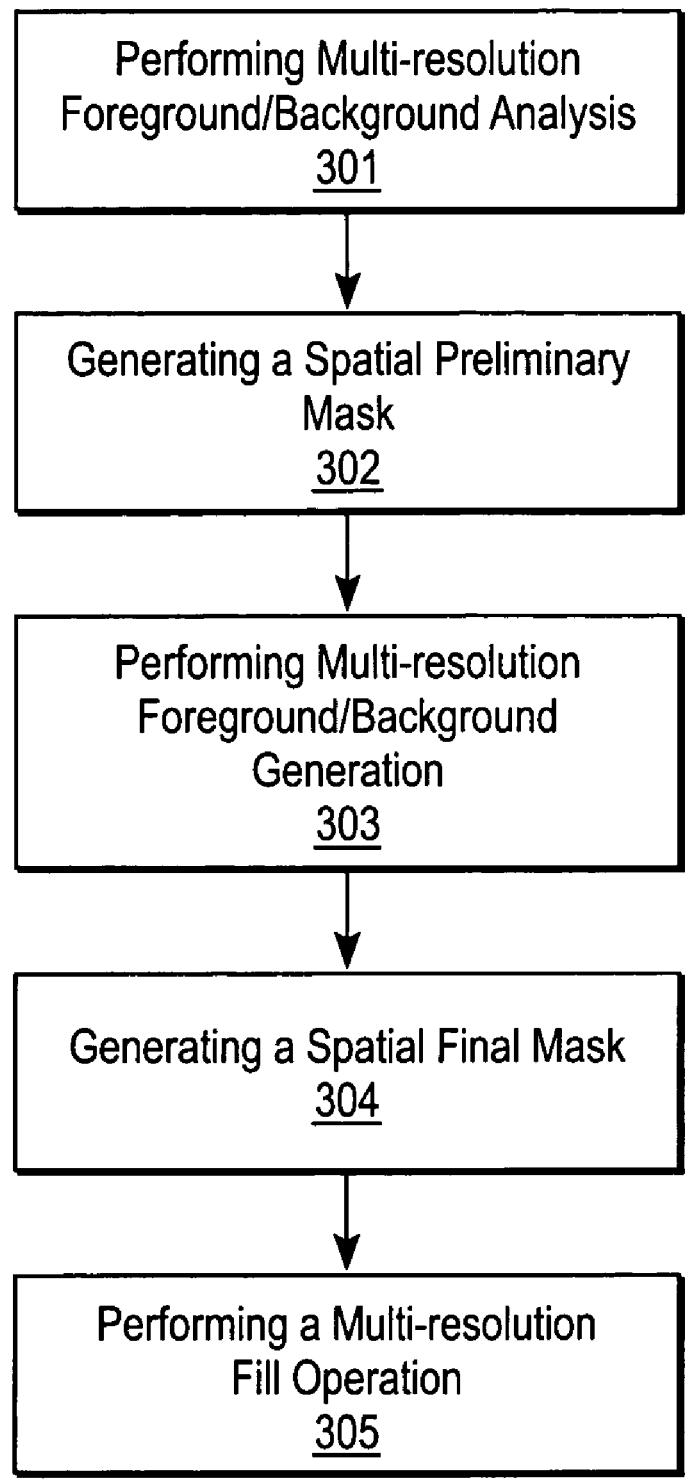
FIG. 3 is a flow diagram of a process for performing the multi-resolution segmentation and fill.

FIG. 3 is a flow diagram of a process for performing the multi-resolution segmentation and fill. The process is performed by processing logic that may comprise hardware (e.g., circuitry, dedicated logic, etc.), software (such as is run on a general purpose computer system or a dedicated machine), or a combination of both.

Referring to FIG. 3, processing logic first performs multi-resolution foreground/background analysis (processing block 301). The multi-resolution foreground/background analysis creates preliminary foreground and background images from low resolution image data. In one embodiment, the low resolution data is from more than one lower resolution version of an original image.

Next, processing logic generates a spatial preliminary mask (processing block 302). In one embodiment, generating the spatial preliminary mask is performed by classifying pixel locations in the mask into either foreground, background or another category referred to herein as undecided.

After generating the spatial preliminary mask, processing logic performs multi-resolution foreground and background generation (processing block 303). In one embodiment, processing logic propagates foreground pixels to neighbors and uses black, white or a smoothed version of the original image for locations far from any foreground pixels. The process that is used for foreground generation may be used for background generation by propagating background pixels to neighbors and using black, white or a smoothed version of the original image for locations far from any background pixels. The result of this operation is the generation of preliminary background and foreground images.

After multi-resolution foreground and background image generation, processing logic generates a spatial final mask (processing block 304). In one embodiment, processing logic generates the spatial final mask by creating a final mask based on a comparison between the original image with the background and foreground images generated in processing block 303 (Step III) and using processing to reduce noise in the mask. In one embodiment, processing logic also ensures that the foreground and background composite exactly to the original image using the mask.

After generating the final spatial mask, processing logic performs a multi-resolution fill operation (processing block 305). In one embodiment, processing logic performs the multi-resolution fill operation by filling pixels in foreground and background images at "don't care" locations (pixels not used in composition) in the final foreground and background images by propagating the foreground and background values respectively.

Multi-Resolution Foreground/Background Analysis (Step I)

In one embodiment, the multi-resolution foreground/background analysis comprises multiple operations. The first part of multi-resolution foreground/background analysis, referred to herein as Sub-step Ia, computes a forward transform. In one embodiment, the transform comprises the redundant Haar forward wavelet transform. However, other transforms may be used such as, for example, redundant or critically sampled wavelet transforms may be used. In addition to the Haar, longer wavelet filters, such as the 5, 3 or 9,7 filters used in JPEG 2000, or Daubechies or spline wavelets may be used. Laplacian pyramid transforms using Gausian or other low pass filters may be used.

In one embodiment, the forward wavelet transform is used to obtain three decomposition levels. In such a case, low pass coefficients for 3 transform levels are computed. In one embodiment, the low pass coefficients are stored for all levels and highpass coefficients (or information about them) are computed as needed during the second (inverse) part of the multi-resolution foreground/background analysis.

The second operation of the multi-resolution foreground/background analysis operation, referred to herein as Sub-step Ib, examines the low pass coefficients and assigns low pass coefficients to the foreground and the background, starting at lower resolution and processing to higher resolution. That is, using the lower resolution low pass coefficients (e.g., low pass coefficients from the third level of wavelet transform), an attempt is made to assign them to being part of the background or the foreground.

When an assignment is made at a lower resolution level, it is propagated through other higher resolution levels. In one embodiment, the assignment is propagated to other higher resolution levels by setting high pass coefficients to zero for higher resolutions (to four child coefficients) and the redundant Haar inverse transform is used to obtain a smooth result. A parent coefficient is a coefficient at one resolution level m. This coefficient includes information from a specific local region in the original image. (A parent's children coefficients are the coefficients at the next higher resolution level m−1, that together cover the same spatial region as the parent coefficient at level m.) The redundant Haar inverse transform obtains the smooth result by averaging the results of the four phases. In another embodiment, if a critically sampled transform is used, there is only one phase and no averaging is performed.

At the lowest analysis resolution and for higher resolutions that are not set by propagation, the lightest and the darkest low pass coefficient in a 2×2 region are found. If their difference is above a threshold, the lightest low pass coefficient is assigned as a background value to a preliminary background image and the darkest coefficient is assigned as a foreground value to a preliminary foreground image. If their difference is below the threshold, the low pass coefficient from the next higher resolution is used for both the preliminary foreground and background images.

In one embodiment, for 0 . . . 255 data, the threshold for differences between level 2 and higher level low pass coefficients is 32N and for differences between level 1 coefficients is 80N, where N is the number of components (e.g., 3 for RGB data). In one embodiment, the differences between original pixel values (level 0) are not considered. In one embodiment, the differences are computed using the $L_1$ norm.

The output of the multi-resolution foreground/background analysis is a preliminary foreground image and a preliminary background image.

FIG. 4 is a flow diagram of one embodiment of a process for performing multi-resolution foreground/background analysis. The process is performed by processing logic that may comprise hardware (e.g., circuitry, dedicated logic, etc.), software (such as is run on a general purpose computer system or a dedicated machine), or a combination of both.

Referring to FIG. 4, processing logic generates coefficients for multiple transform levels using a forward transform (processing block 401). In one embodiment, only low pass coefficients are used; therefore, only low pass coefficients are stored. In one embodiment, the transform is the redundant Haar transform.

Any number of transform levels may be performed. In one embodiment, processing logic generates coefficients for three levels of transform. The number of transform levels may be chosen to be a number sufficient to remove halftone noise in the preliminary mask created below. The transform levels removes noise in the preliminary foreground and background such that noise does not enter the preliminary mask in the next step.

After generating coefficients for multiple transform levels using a forward transform, processing logic assigns low pass coefficients to the foreground, the background, or a value indicative of a state in which the processing logic is undecided in its assignment between the foreground or the background (processing block 402).

Figure 5:
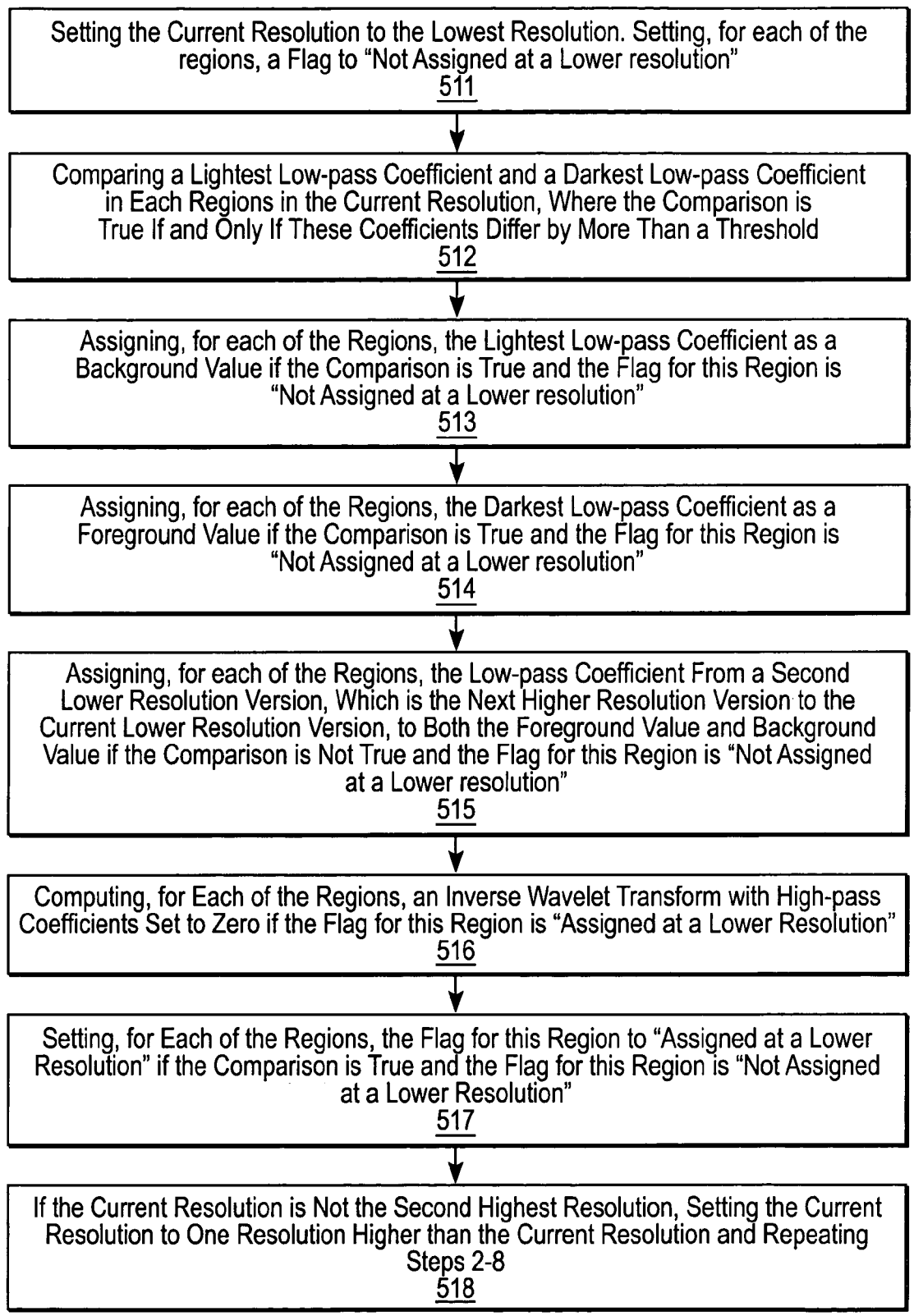
FIG. 5 is a flow diagram of one embodiment of a process for assigning low pass coefficients to the foreground, background or an undecided value.

FIG. 5 is a flow diagram of one embodiment of a process for assigning low pass coefficients to the foreground, background or an undecided value. The process is performed by processing logic that may comprise hardware (e.g., circuitry, dedicated logic, etc.), software (such as is run on a general purpose computer system or a dedicated machine), or a combination of both. Referring to FIG. 5, the process begins by processing logic setting the current resolution to the lowest resolution and setting, for each of the regions, a flag to "not assigned at a lower resolution" (processing block 511).

Then processing logic compares a lightest low pass coefficient and a darkest low pass coefficient in each regions in the current resolution, where the comparison is true if and only if these coefficients differ by more than a threshold (processing block 512). In one embodiment, the lightest coefficient is the coefficient closest to white according to a luminance or color difference metric. Similarly, the darkest coefficient is closest to black. In an alternative embodiment, processing logic compares two low pass coefficients having the largest color difference in each of the regions in a first lower resolution version. The color difference may be measured in $\Delta E$ units. In one embodiment, processing logic compares the lightest and darkest low pass coefficients using a distance measure (e.g., the $L_1$, $L_2$, $L_\infty$ norm).

After the comparison, processing logic, assigns, for each of the regions, the lightest low pass coefficient as a background value if the comparison is true and the flag for this region is "not assigned at a lower resolution" (processing block 513) and assigns, for each of the regions, the darkest low pass coefficient as a foreground value if the comparison is true and the flag for this region is "not assigned at a lower resolution" (processing block 514).

Processing logic also assigns, for each of the regions, a low pass coefficient from a second lower resolution version, which is the next higher resolution version to the current lower resolution version, to both the foreground value and background value if the comparison is not true and the flag for this region is "not assigned at a lower resolution" (processing block 515). Alternatively, the assignments could be to don't care values in a manner similar to foreground/background generation described in conjunction with the multi-resolution foreground and background generation described herein (Step III).

Next, processing logic computes, for each of the regions, an inverse wavelet transform with high pass coefficients set to zero if the flag for this region is "assigned at a lower resolution" (processing block 516).

Next, processing logic sets, for each of the regions, the flag for this region to "assigned at a lower resolution" if the comparison is true and the flag for this region is "not assigned at a lower resolution" (processing block 517).

Finally, if the current resolution is not the second highest resolution, processing logic sets the current resolution to one resolution higher than the current resolution (processing block 518) and repeating processing blocks 512-518.

Thus, assigning low pass coefficients begins by examining low pass coefficients in a first of multiple lower resolution versions of the image and then proceeds to at least a second lower resolution version having a higher resolution than the first lower resolution version.

Thus, the preliminary foreground and background images are created from low resolution image data relating to multiple lower resolution versions of an original image.

In another alternative embodiment, instead of finding the lightest and the darkest low pass coefficients, the pair with the greatest $L_1$ color difference or other color difference could be used, or the largest Haar wavelet coefficient could be compared with a threshold.

To reiterate, other wavelet transforms other than the Haar could be used.

Spatial Preliminary Mask Generation (Step II)

In Step II, a preliminary mask is generated from the original image and the preliminary foreground and background images created during the multi-resolution foreground/background analysis (Step I). In one embodiment, each pixel location in the preliminary mask has one of three values referred to as foreground, background and undecided. If the preliminary foreground and background images at a particular pixel location do not differ by a threshold (e.g., 64N), then the mask value at the corresponding pixel location in the mask is undecided. Otherwise, the original image value for the pixel is compared with the values at the corresponding location in the foreground image, the background image and a predetermined value between the values at the corresponding location in foreground and background images. In one embodiment, the predetermined value is the value halfway between the values at the corresponding location in foreground and background images (i.e., an average of the foreground and background values). In other embodiments, the predetermined value may be sufficiently close to the halfway values. The value may depend on segmentation data (e.g., text on halftone, halftone characteristics by specific gray value). Other choices include statistical measures such as local averages, as used in adaptive thresholding techniques.

If the value is closer to the foreground or background values, it is classified as foreground or background. If it is closer to the predetermined value (e.g., the average value), then the mask value is classified as undecided. The use of the comparison with the "halfway" value creates a "dead zone" between the foreground and background decision regions.

Figure 6:
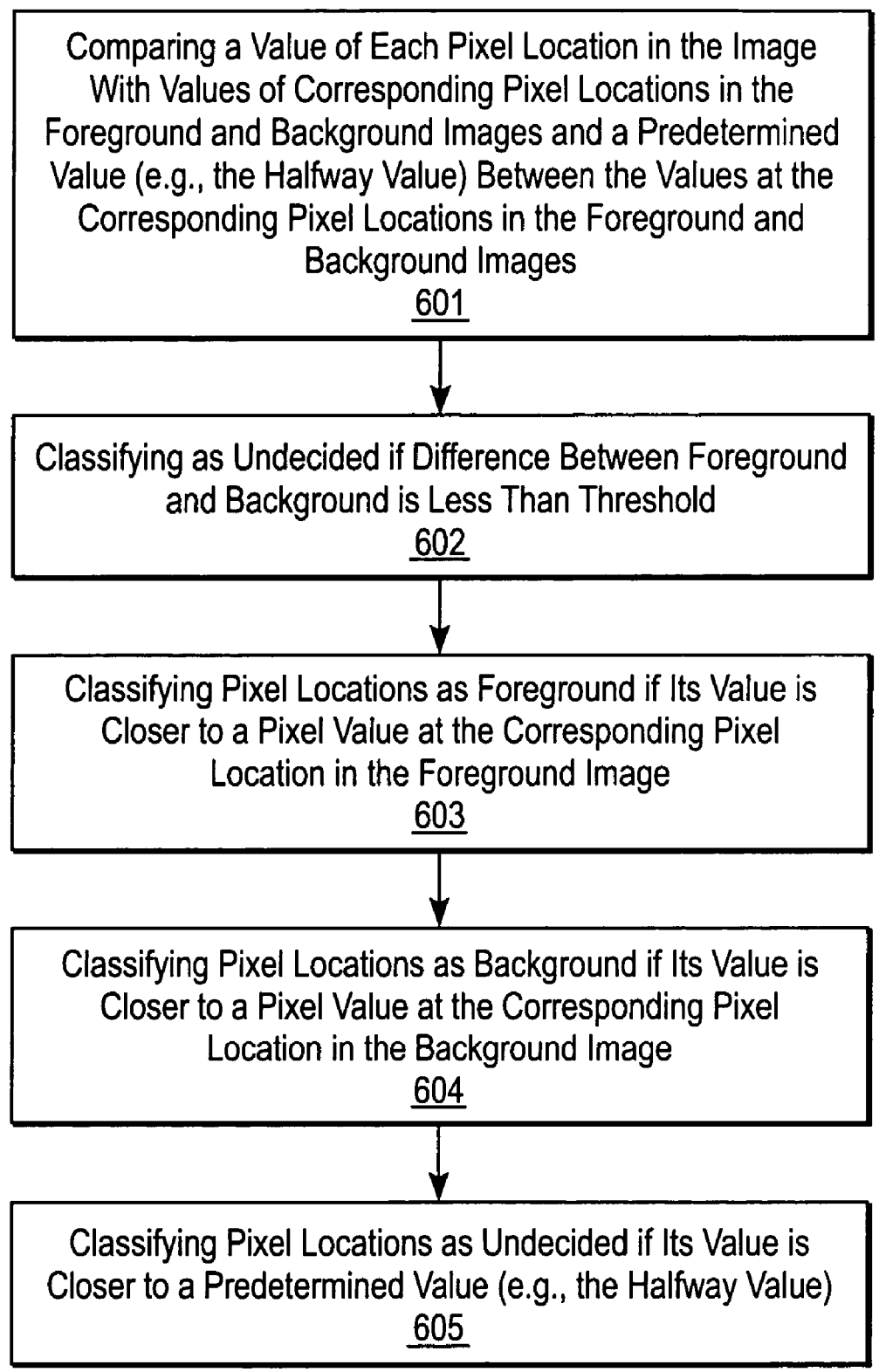
FIG. 6 is a flow diagram of one embodiment of a process for generating a spatial preliminary mask from the original image and the preliminary background and foreground images by classifying each pixel location in the preliminary mask.

FIG. 6 is a flow diagram of one embodiment of a process for generating a spatial preliminary mask from the original image and the preliminary background and foreground images by classifying each pixel location in the preliminary mask. The process is performed by processing logic that may comprise hardware (e.g., circuitry, dedicated logic, etc.), software (such as is run on a general purpose computer system or a dedicated machine), or a combination of both.

Referring to FIG. 6, processing logic compares a value of each pixel location in the image with values of corresponding pixel locations in the foreground and background images and a predetermined value (e.g., the halfway value) between the values at the corresponding pixel locations in the foreground and background images (processing block 601). If the difference between the foreground and background is less than the threshold, then the pixel is classified as undecided (processing block 602). Processing logic classifies pixel locations as foreground if its value is closer to a pixel value at the corresponding pixel location in the foreground image (processing block 603). Processing logic classifies pixel locations as background if its value is closer to a pixel value at the corresponding pixel location in the background image (processing block 604). Processing logic classifies pixel locations as undecided if its value is closer to the predetermined value (e.g., the halfway value) (processing block 605).

Multi-Resolution Foreground/Background Generation (Step III)

Based on the mask (and the propagation of the mask to lower resolutions), the spatial extent of foreground and background classified values are expanded in the respective foreground and background images at the expense of non-foreground and non-background values, respectively, in Step III. Expanding the spatial extent begins by applying a forward transform to the foreground classified values and background classified values. In one embodiment, three transform levels are used. Note that the first part of the multi-resolution foreground/background generation operation, Sub-step IIIa, is similar to the application of the redundant Haar forward transform as described below except that the filter coefficients depend of the preliminary mask. In one embodiment, only low pass coefficients are computed and stored.

More particularly, consider performing the transform for the foreground. If all four input values were previously classified as foreground in the spatial preliminary mask, then the low pass coefficient is computed normally and is classified as foreground. If none of the four input values were classified as foreground (i.e. they are background or undecided), then the lowpass coefficient is computed normally and is classified as "don't care." ("Don't care" coefficients are coefficients that do not contribute in the inverse transform. As discussed below, these are coefficients that will be multiplied by a weight of zero. In some cases, these "don't care" coefficients may be used for boundary handling instead of mirroring. In general, "don't care" coefficients have support that corresponds to "don't care" pixels—they both are at "don't care" locations.) If not all four input values were previously classified as foreground and at least one of the input values is classified as foreground, then the 1 to 3 input values that are classified as foreground are averaged to create a low pass coefficient (which is not a normal Haar coefficient) and this coefficient is classified as foreground. The same process may be used for the background, with the classifications background and "don't care" where foreground is now included in "don't care."

Note that in some cases, coefficients are the same as previously computed coefficients and do not have to be computed again if available from storage.

The second part of the multi-resolution foreground/background generation operation, Step IIIb, propagates foreground and background classified values to lower resolution versions of the background and foreground images. In the case of the foreground, for example, the inverse redundant Haar wavelet smooth reconstruction in which all high pass coefficients are set 0 is used when all four input values were classified as foreground. If 1 to 3 inputs were classified as foreground, their average is used as the inverse transform value (instead of the normal Haar inverse). (If a filter other than the Haar is used, averaging may be replaced by an appropriately truncated and normalized version of the filter.) If no inputs where classified as foreground, then the new value is either classified as black, white or the corresponding normal Haar low pass coefficient (or alternatively an original sample for level 0). The same process is applied to inputs classified as background. Black is chosen for the foreground when the distance (e.g., the $L_1$ norm) from the Haar low pass value to white is less than ⅜ of the dynamic range of the signal (e.g., 96 N). Similarly, white is chosen for the background when the distance from the Haar low pass value to black is less than ⅜ of the dynamic range. Note that use of the ⅜ threshold causes the foreground and background to have similar values around the 50% threshold, which should reduce the visibility of segmentation artifacts.

FIG. 7 is a flow diagram of one embodiment of a process for performing multi-resolution foreground and background generation. The process is performed by processing logic that may comprise hardware (e.g., circuitry, dedicated logic, etc.), software (such as is run on a general purpose computer system or a dedicated machine), or a combination of both.

Referring to FIG. 7, processing logic initially computes low pass coefficients of the foreground classified values and background classified values for multiple transform levels (processing block 701).

After computing low pass coefficient for multiple transform levels, processing logic computes inverse values of the low pass coefficients corresponding to the foreground and background based on numbers of pixels in groups of the pixels in the preliminary mask previously classified as foreground, background and undecided (processing block 702).

Figure 8:
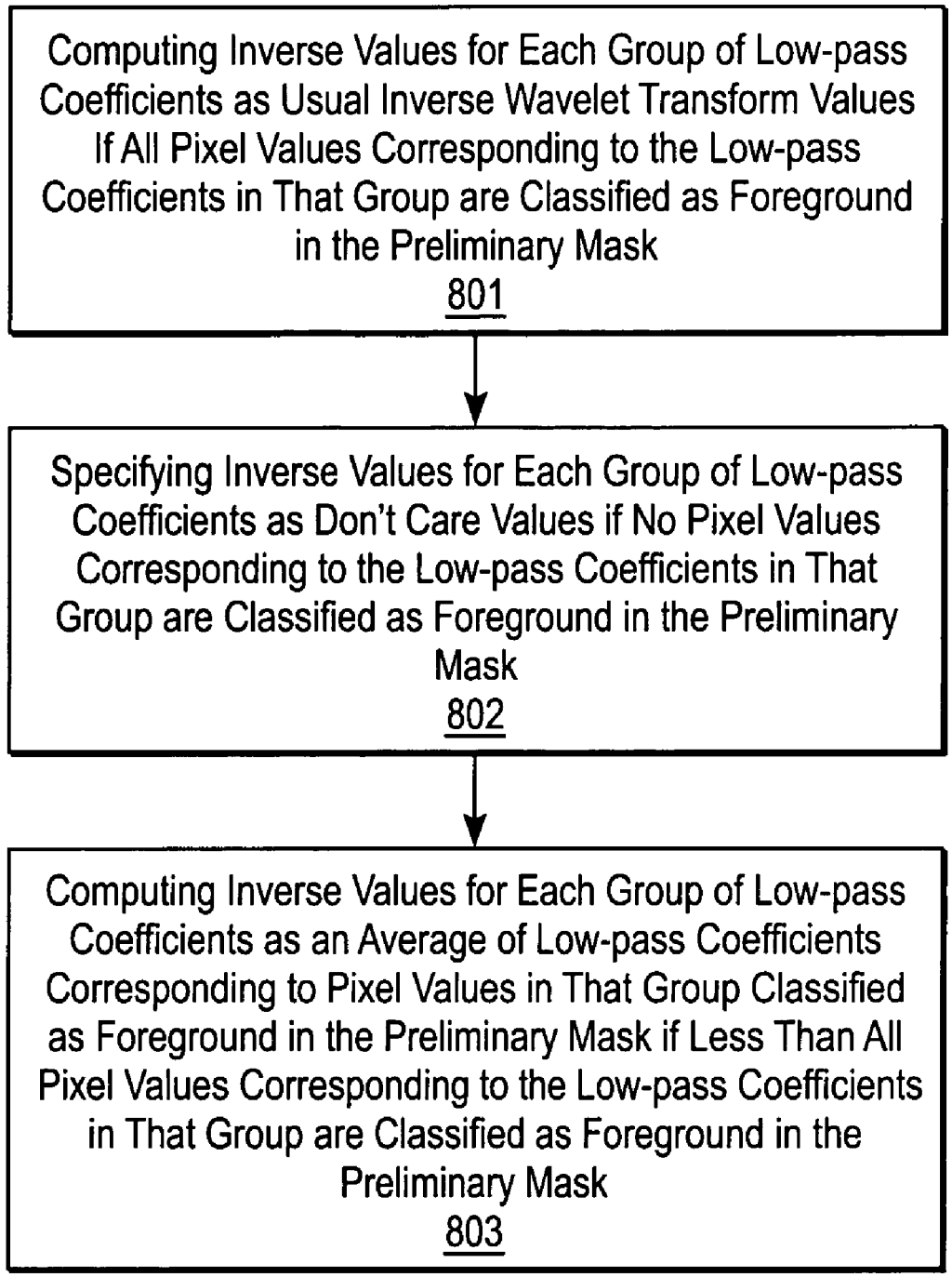
FIG. 8 is a flow diagram of one embodiment of a process for computing inverse values for the low pass coefficients corresponding to the foreground.

FIG. 8 is a flow diagram of one embodiment of a process for computing inverse values for the low pass coefficients corresponding to foreground. The process is performed by processing logic that may comprise hardware (e.g., circuitry, dedicated logic, etc.), software (such as is run on a general purpose computer system or a dedicated machine), or a combination of both.

Referring to FIG. 8, processing logic computes inverse values for each group of low pass coefficients as usual inverse wavelet transform values if all pixel values corresponding to the low pass coefficients in said each group are classified as foreground in the preliminary mask (processing block 801). Processing logic specifies inverse values for each group of low pass coefficients as don't care values if no pixel values corresponding to the low pass coefficients in said each group are classified as foreground in the preliminary mask (processing block 802). Processing logic computes inverse values for each group of low pass coefficients as an average of low pass coefficients corresponding to pixel values in said each group classified as foreground in the preliminary mask if less than all pixel values corresponding to the low pass coefficients in said each group are classified as foreground in the preliminary mask (processing block 803).

Figure 9:
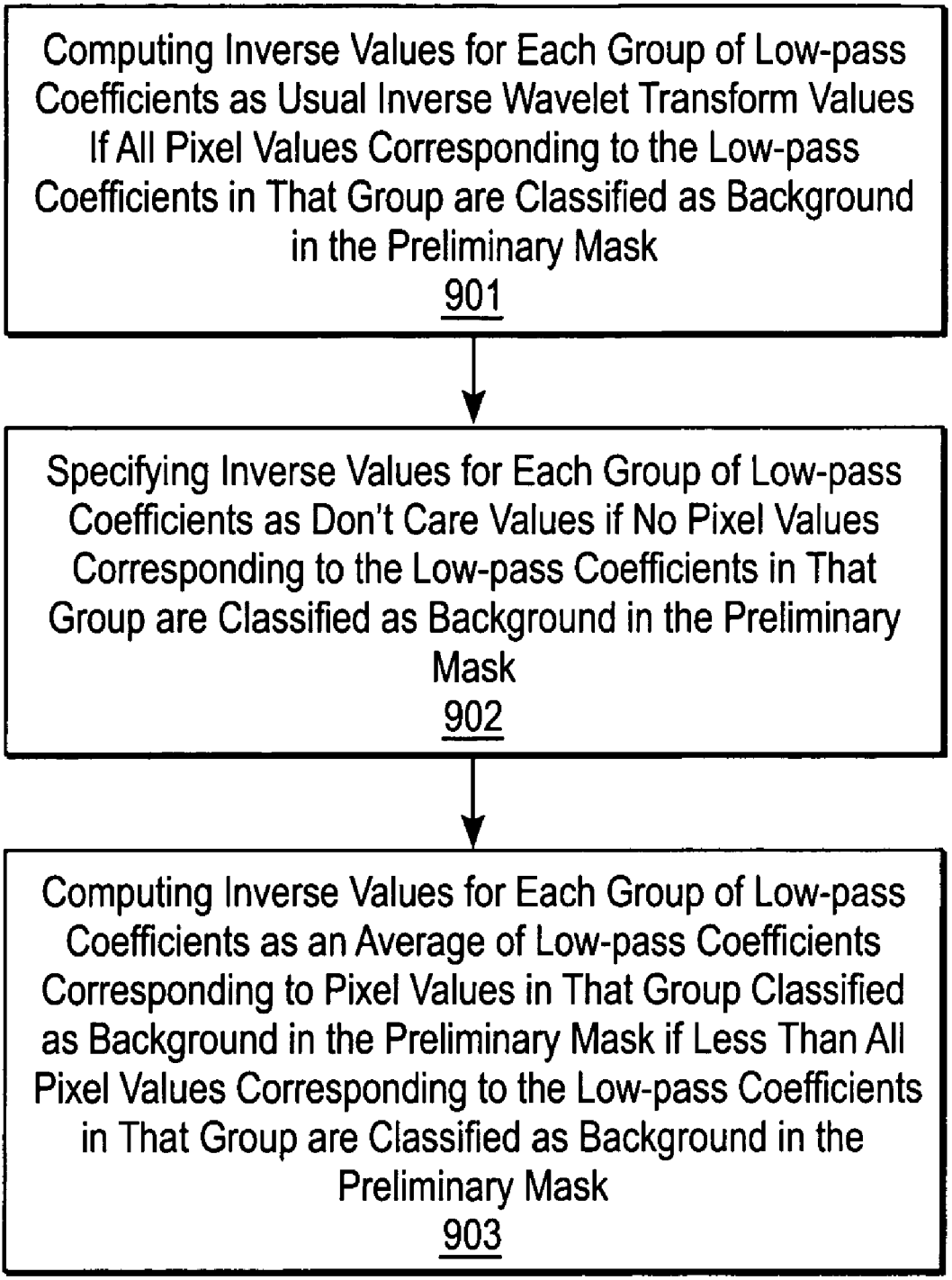
FIG. 9 is a flow diagram of one embodiment of a process for computing inverse values for the low pass coefficients corresponding to the background.

FIG. 9 is a flow diagram of one embodiment of a process for computing inverse values for the low pass coefficients corresponding to the background. The process is performed by processing logic that may comprise hardware (e.g., circuitry, dedicated logic, etc.), software (such as is run on a general purpose computer system or a dedicated machine), or a combination of both. Referring to FIG. 9, processing logic computes inverse values for each group of low pass coefficients as background if all pixel values corresponding to the low pass coefficients in that group are classified as background in the preliminary mask (processing block 901). Processing logic specifies inverse values for each group of low pass coefficients as don't care values if no pixel values corresponding to the low pass coefficients in that group are classified as background in the preliminary mask (processing block 902). Processing logic computes inverse values for each group of low pass coefficients as an average of low pass coefficients corresponding to pixel values in that group classified as background in the preliminary mask if less than all pixel values corresponding to the low pass coefficients in that group are classified as background in the preliminary mask (processing block 903).

Referring back to FIG. 7, after classification, processing logic propagates foreground and background classified values to lower resolution versions of the foreground and background images (processing block 702). FIG. 10 is a flow diagram of one embodiment of a process for propagating foreground classified values. The process is performed by processing logic that may comprise hardware (e.g., circuitry, dedicated logic, etc.), software (such as is run on a general purpose computer system or a dedicated machine), or a combination of both. Referring to FIG. 10, processing logic uses a value that results from performing the inverse redundant Haar wavelet smooth reconstruction in which all high pass coefficients are set to 0 when all four input values are classified as foreground (processing block 1001), uses a value that is an average of the input values classified as foreground as the inverse transform value if only one to three input values are classified as foreground (processing block 1002), and uses a new value if none of the input values are classified as foreground (processing block 1003). In one embodiment, the new value is one selected from a group consisting of black, white or the corresponding normal Haar low pass coefficient. In one embodiment, the new value is black for the foreground when a distance metric indicating a distance from the Haar low pass value to white is less than ⅜ of the dynamic range of the signal that varies from values corresponding to black to values corresponding to white.

Figure 11:
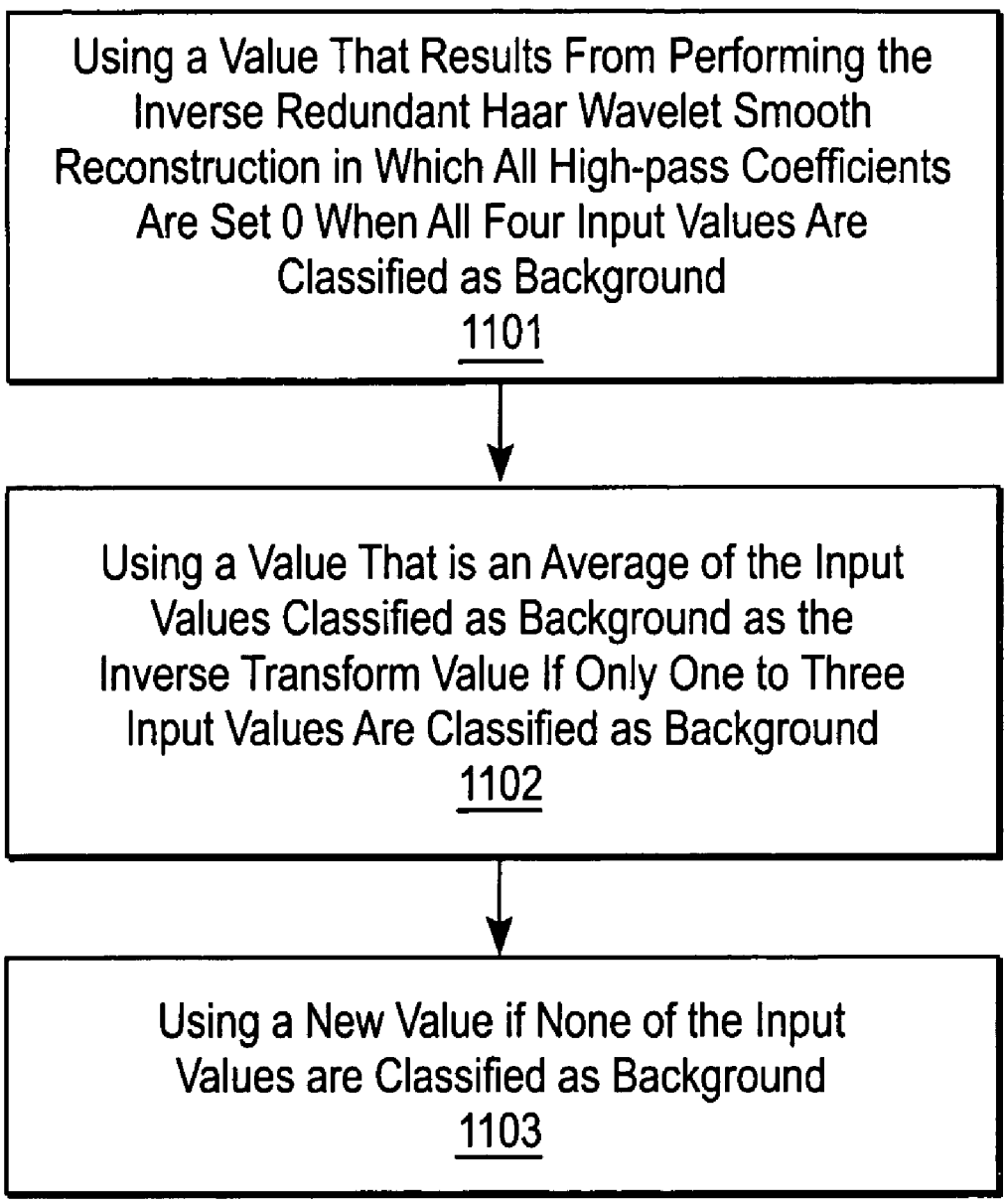
FIG. 11 is a flow diagram of one embodiment of a process for propagating background classified values.

FIG. 11 is a flow diagram of one embodiment of a process for propagating background classified values. The process is performed by processing logic that may comprise hardware (e.g., circuitry, dedicated logic, etc.), software (such as is run on a general purpose computer system or a dedicated machine), or a combination of both. Referring to FIG. 11, processing logic uses a value that results from performing the inverse redundant Haar wavelet smooth reconstruction in which all high pass coefficients are set to 0 when all four input values are classified as background (processing block 1101), uses a value that is an average of the input values classified as background as the inverse transform value if only one to three input values are classified as background (processing block 1102), and uses a new value if none of the input values are classified as background (processing block 1103). The new value is one selected from a group consisting of black, white or the corresponding normal Haar low pass coefficient. In one embodiment, the new value is white for the background when a distance metric indicating a distance from the Haar low pass value to black is less than ⅜ of the dynamic range of the signal that varies from values corresponding to black to values corresponding to white.

Final Mask Generation (Step IV)

In one embodiment, the final mask generation operation has three parts. The first part of final mask generation operation, referred to herein as Sub-step IVa "create," creates a mask with foreground, background or undecided values. In one embodiment, creating the mask with foreground, background or undecided values includes computing the distance between an original pixel value and its corresponding background and foreground pixels and also the distance between these background and foreground pixels. If the absolute difference between the foreground distance and the background distance is below a threshold (e.g., 32N), then the value is classified as undecided; otherwise, the value is classified foreground or background according to which of the two distances is smaller.

Figure 12:
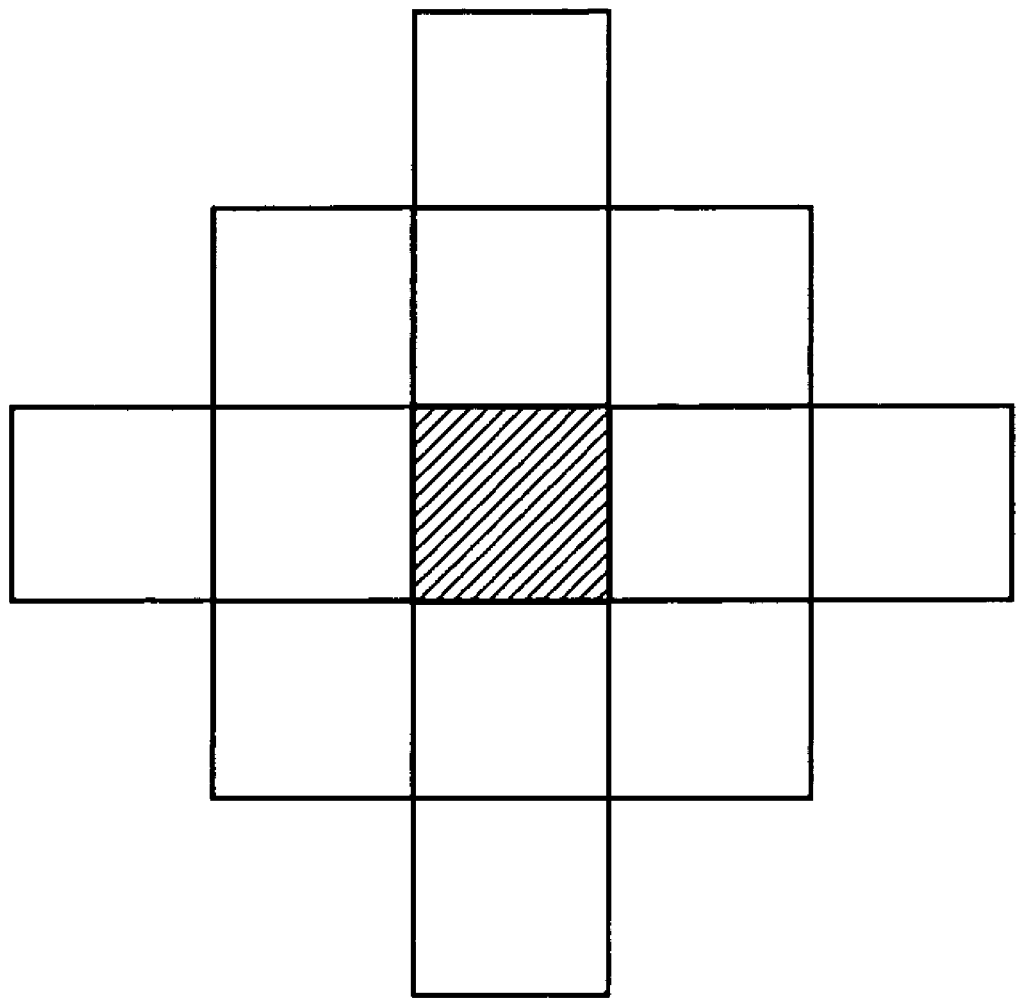
FIG. 12 is a 12 pixel neighborhood used in the final mask generation operation.

FIG. 12 is a 12 pixel neighborhood used by final mask generation (Step IVb). In the second part of the final mask generation operation, referred to herein as Sub-step IVb "neighborhood", a neighborhood of mask values is used to reassign values to the foreground or background. In one embodiment, a 12 pixel neighborhood of mask values, such as shown in FIG. 12 is used. Undecided values are reassigned to foreground if at least 6 neighbors are foreground and background otherwise. Singleton pixels with respect to the neighborhood are changed to the neighborhood majority value. For locations where the foreground and background were not assigned in multi-resolution foreground/background analysis operations, values that do not match at least a threshold number of neighbors (e.g., 5) are changed to the neighborhood majority value.

Operations used in the second part of the final mask generation operation are related to area-ratio algorithms and extensions to median filtering discussed in J. Huang, Y. Wang and E. Wong, "Check image compression using a layered coding method," Journal of Electronic Imaging, 7(3), pp. 426-442, July 1998.

One motivation for the 12 pixel neighborhood is to keep the dot over the letter "i" for very small fonts which used a single pixel dot separated from the rest of the letter by one pixel.

Note that the shape of the window may depend on additional information (e.g., bounding boxes of characters from OCR).

The third part of final mask generation operation, referred to herein as Sub-step IVc "update," updates the foreground and background images from the previous operation so that composition using the mask results in a lossless image. In one embodiment, this is accomplished by setting pixels classified as foreground or background to the original image value of the pixels in the foreground and the background images respectively.

Figure 13:
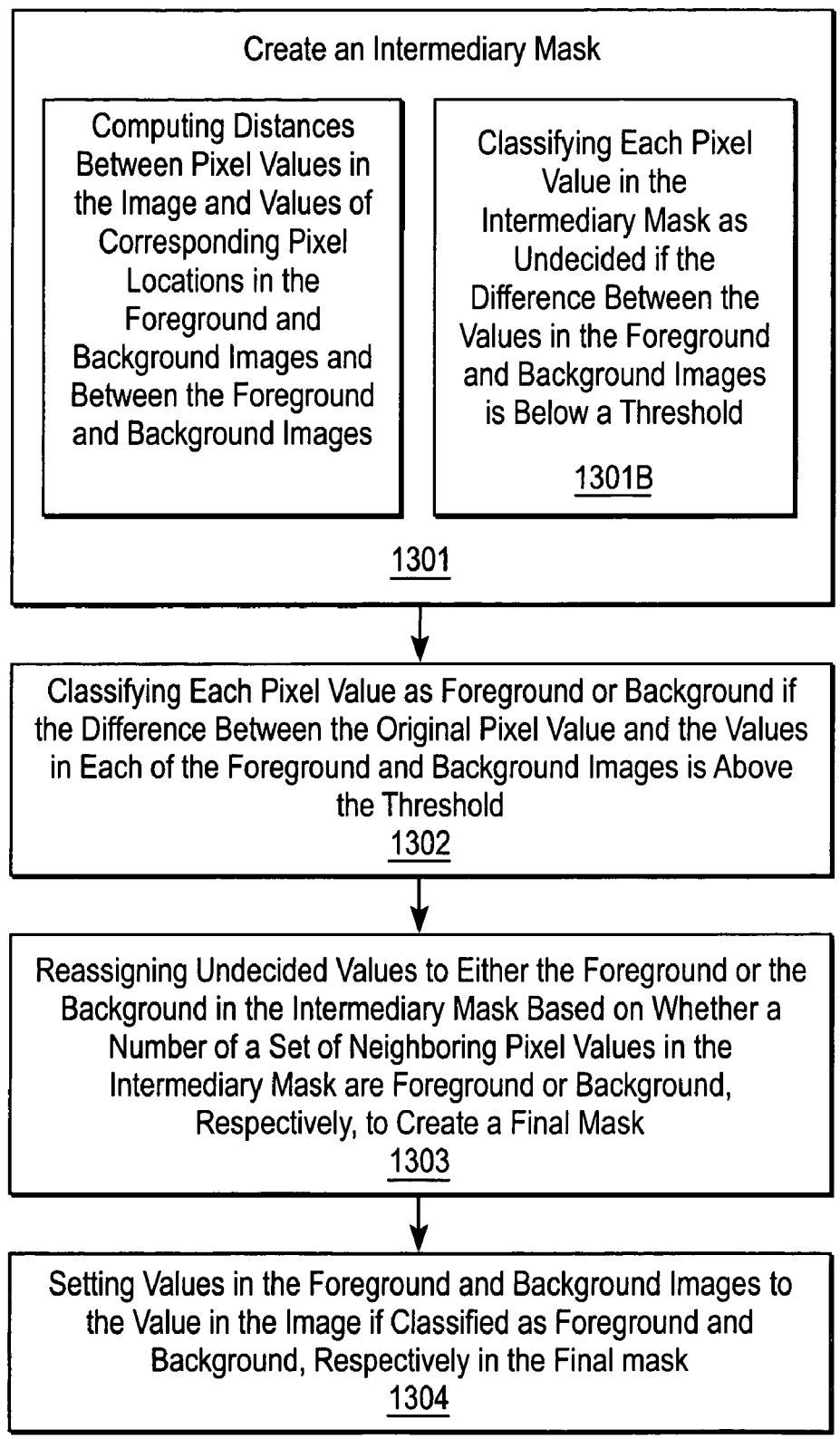
FIG. 13 is a flow diagram of one embodiment of a process for generating the final mask.

FIG. 13 is a flow diagram of one embodiment of a process for generating the final mask. The process is performed by processing logic that may comprise hardware (e.g., circuitry, dedicated logic, etc.), software (such as is run on a general purpose computer system or a dedicated machine), or a combination of both.

Referring to FIG. 13, processing logic creates an intermediary mask (processing block 1301) by computing distances between pixel values in the image and values of corresponding pixel locations in the foreground and background images (processing block 1301A), and classifying each pixel value in the intermediary mask as undecided if the difference between the values in the foreground and background images is below a threshold (processing block 1301B).

Processing logic also classifies each pixel value as foreground or background if the difference between the original pixel value and the values in each of the foreground and background images is above the threshold (processing block 1302). In one embodiment, each pixel value is set to foreground if the distance between each pixel in the image and the foreground image is less than the distance between each pixel in the image and the background image and is set to background if the distance between each pixel in the image and the background image is less than the distance between each pixel in the image and the foreground image.

Processing logic reassigns undecided values to either the foreground or the background in the intermediary mask based on whether a number of a set of neighboring pixel values in the final mask as output are foreground or background, respectively (processing block 1303). This creates the final mask.

Processing logic then sets values in the foreground and background images to the value in the image if classified as foreground and background, respectively in the final mask (processing block 1304).

Thus, the processing logic compares the original image with background and foreground images created using image data from multiple resolutions of the first image, where the mask is such that the foreground and background images composite to the first image using the mask.

Multi-Resolution Fill (Step V)

The multi-resolution fill operation is similar to multi-resolution foreground/background generation operation. The only differences between the two operations are as follows. This operation finalizes the creation of the foreground and background images. In one embodiment, five transform levels are used. The final mask is used instead of the preliminary mask. In the second part, Sub-step Vb, if no inputs where classified as foreground, then the new value is the value from the normal inverse Haar transform. The outputs are the final foreground and background images.

A Mathematical Description of the Technique for 1-Dimension Signals

The technique above is explained in mathematical notation for 1-dimension signals and a scalar (grayscale) input below. For purposes of the mathematical description, inputs are assumed to be integers in the range 0 . . . 255.

Sub-Step Ia

FIG. 14 shows the input (x) and the low pass coefficients (c) for 3 levels (J=3), the forward part of multi-resolution foreground/background analysis (Sub-step Ia).

The low pass Haar wavelet coefficient c at level j, j=1, . . . , J, and position i is:

$$c_i^j = \frac{c_i^{j-1} + c_{i+2^{j-1}}^{j-1}}{2} \quad (1)$$

where the input signal is used in place of level 0 low pass coefficients:

$$c_i^0 = x_i \quad (2)$$

and where needed, mirroring at boundaries where the signal is defined for $0 \leq i < I$ can be used:

$$c_{-1}^j = c_0^j \text{ and } c_I^j = c_{I-1}^j \quad (3)$$

The high pass Haar wavelet coefficient d at level j and position i is:

$$d_i^j = c_i^{j-1} - c_{i+2^{j-1}}^{j-1} \quad (4)$$

(Note the redundant or over-complete transform is computed, so i=0, 1, 2, 3, . . . for all levels. The transform, equations (1) and (4), may also be computed with the denominator 1, $\sqrt{2}$ or 2 instead of 2 and 1. In one embodiment, the inverse transform have a denominator to ensure that the forward and inverse together have gain 1.)

Sub-Step Ib

The inverse part of multi-resolution foreground/background analysis, Step Ib, loops over levels j=J, . . . , 1.

First, differences between coefficients are considered. A level dependent threshold, $\epsilon^j$ is used (j is an index, not an exponent). One choice of values for $\epsilon^j$ is 80 for j=1 and 32 for j>1. If $$|c_i^j - c_{i+2^j}^j| > \epsilon^j \quad (5)$$

and this has not been true for location i or $i-2^{j+1}$ for a previous level (>j) then $$c_{b,i}^j = \max(c_i^j, c_{i+2^j}^j) \quad (6)$$
$$c_{f,i}^j = \min(c_i^j, c_{i+2^j}^j)$$
$$d_{b,i}^k = 0$$
$$d_{f,i}^k = 0$$

where k=1, . . . , j. Otherwise $$c_{b,i}^j = c_i^j \quad (7)$$
$$c_{f,i}^j = c_i^j$$
$$d_{b,i}^k = d_i^k$$
$$d_{f,i}^k = d_i^k \text{ for } k = 1, \cdots, j.$$

Second, the inverse Haar wavelet transform is applied. The transform for the foreground is given below. The transform for the background is computed in the same manner. This transform can be described as $$c_{f,i}^{j-1} = \frac{c_{f,i-2^{j-1}}^j - \frac{1}{2}d_{f,i-2^{j-1}}^j + c_{f,i}^j + \frac{1}{2}d_{f,i}^j}{2} \quad (8)$$

but for the equation 6 case it can be simplified to $$c_{f,i}^{j-1} = \frac{c_{f,i-2^{j-1}}^j + c_{f,i}^j}{2} \quad (9)$$

and for the equation 7 case, it can be simplified to $$c_{f,i}^{j-1} = c_i^{j-1}. \quad (10)$$

The result for level j=1 is the preliminary foreground image, $x_f$, and the preliminary background image, $x_b$. Thus, the same transform computation is used for the background image.

Step II

In one embodiment, step II uses three distances:

$$D_f = |x - x_f| \quad (11)$$
$$D_b = |x - x_b|$$
$$D_x = \left|x - \left(\frac{x_f + x_b}{2}\right)\right|$$

The preliminary mask, $\tilde{m}_i$, is created $$\tilde{m}_i = \begin{cases} 1, & \text{if } |x_{f,i} - x_{b,i}| \geq t \wedge \min(D_f(i), D_b(i), D_x(i)) = D_b(i) \\ -1, & \text{if } |x_{f,i} - x_{b,i}| \geq t \wedge \min(D_f(i), D_b(i), D_x(i)) = D_f(i) \\ 0, & \text{otherwise} \end{cases} \quad (12)$$

where $\tilde{m}_i=1$ is background, $\tilde{m}_i=-1$ is foreground, $\tilde{m}_i=0$ is undecided and for example, t=64.

Sub-Step IIIa

In one embodiment, the weights for the foreground and background $w^j_{f,i}$ and $w^j_{b,i}$ for level j, j=1, ..., J are computed as $$w^j_{f,i} = \begin{cases} 1, & \text{if } \tilde{m}_{i+i'} = -1 \\ 0, & \text{otherwise} \end{cases} \quad (13)$$

$$w^j_{b,i} = \begin{cases} 1, & \text{if } \tilde{m}_{i+i'} = -1 \\ 0, & \text{otherwise} \end{cases}$$

where i' is any value in the range 0, ..., $2^{j-1}-1$, and for example J=3.

In one embodiment, for the foreground, let $s^j_{f,i} = w^j_{f,i} + w^j_{f,i+2^{j-1}}$.

If $s^j_{f,i} > 0$, then $$c'^j_{f,i} = \frac{w^j_{f,i} \cdot c'^{j-1}_{f,i} + w^j_{f,i+2^{j-1}} \cdot c'^{j-1}_{f,i+2^{j-1}}}{s^j_{f,i}} \quad (14)$$

where $$c_{f,i}^{\prime 0} = x_{f,i} \quad (15)$$

Otherwise, the $c_{f,i}^{\prime j}$ value is "don't care" (because eventually it will be multiplied by a weight of zero or will be used only as boundary condition value). If some value is desired, the usual forward Haar transform may be used, $c_{f,i}^{\prime j} = c_i^j$.

The background is computed in the same manner.

Sub-Step IIIb

In one embodiment, sub-step IIIb is computed for levels j=J, ..., 1 as follows for the foreground. Let update weights be:

$$\hat{w}^j_{f,i} = \begin{cases} 1, & \text{if } \tilde{m}_{i+\hat{i}'} = -1 \\ 0, & \text{otherwise} \end{cases} \quad (16)$$

$$\hat{w}^j_{b,i} = \begin{cases} 1, & \text{if } \tilde{m}_{i+\hat{i}'} = 1 \\ 0, & \text{otherwise} \end{cases}$$

where $\hat{i}'$ is any value in the range 0, ..., $2^j-1$.

Let $$\hat{s}^j_{f,i} = \hat{w}^j_{f,i-2^{j-1}} + \hat{w}^j_{f,i} \quad (17)$$

Case 1: If $\hat{s}^j_{f,i} > 0$ then $$\hat{c}'^{j-1}_{f,i} = \frac{\hat{w}^j_{f,i-2^{j-1}} \cdot c'^{j-1}_{f,i-2^{j-1}} + \hat{w}^j_{f,i} \cdot c'^{j}_{f,i}}{\hat{s}^j_{f,i}} \quad (18)$$

Case 2: Otherwise:

$$\hat{c}'^{j-1}_{f,i} = \begin{cases} 0, & \text{if } c^{j-1}_i > \varepsilon_w \\ c^{j-1}_i, & \text{otherwise} \end{cases} \quad (19)$$

A slightly different function is used for the background:

$$\hat{c}'^{j-1}_{b,i} = \begin{cases} 255, & \text{if } c^{j-1}_i < \varepsilon_b \\ c^{j-1}_i, & \text{otherwise} \end{cases} \quad (20)$$

where, for example, $\epsilon_w=160$ and $\epsilon_b=96$.

Case 3: For levels j<J:

$$\hat{c}'^{j-1}_{f,i} = \left(\frac{\hat{c}'^j_{f,i-2^{j-1}} + \hat{c}'^j_{f,i}}{2}\right) \quad (21)$$

The background is computed in the same manner. In one embodiment, the foreground and background results are:

$$x'_{f,i} = \hat{c}'^0_{f,i} \quad (22)$$

$$x'_{b,i} = \hat{c}'^0_{b,i}$$

Sub-Step IVa

In one embodiment, the following distances are computed:

$$D'_{fb} = |x'_f - x'_b| \quad (23)$$

$$D'_f = |x'_f - x|$$

$$D'_b = |x'_b - x|$$

In one embodiment, a mask $m'_i$ with $-1$=foreground, $1$=background and $0$=undecided is created as follows.

$$m'_i = \begin{cases} -1, & \text{if } (D'_{fb}(i) > \varepsilon_{fb}) \wedge (D'_f(i) < D'_b(i)) \\ 1, & \text{if } (D'_{fb}(i) > \varepsilon_{fb}) \wedge (D'_b(i) < D'_f(i)) \\ 0, & \text{otherwise} \end{cases} \quad (24)$$

where for example $\epsilon_{fb}=32$.

Sub-Step IVb

In one embodiment, weights are computed:

$$w'_{f,i} = \begin{cases} 1, & \text{if } m'_i = -1 \\ 0, & \text{otherwise} \end{cases} \quad (25)$$

$$w'_{b,i} = \begin{cases} 1, & \text{if } m'_i = 1 \\ 0, & \text{otherwise} \end{cases}$$

In one embodiment, weights are summed over a neighborhood $N'_{(i)}$.

$$s'_{f,i} = \sum_{n \in N'_{(i)}} w'_{f,n} \qquad (26)$$

$$s'_{b,i} = \sum_{n \in N'_{(i)}} w'_{b,n}$$

Figure 15:
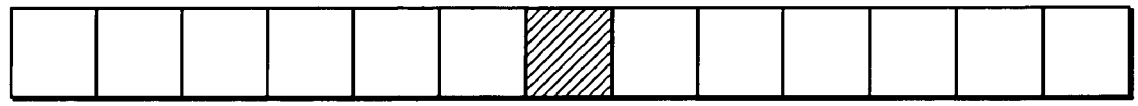
FIG. 15 illustrates an exemplary 12 pixel neighborhood.

For example, for 1D, instead of the 2D neighborhood in FIG. 12, use the following 12 pixel neighborhood for $N'_{(i)}$ so n takes on values i−6, . . . , i−1 and i+1, . . . , i+6 as shown in FIG. 15:

A binary mask, m", without undecided values, is created:

$$m''_i = \begin{cases} 1, \text{ if } (m'_i = -1) \vee ((m'_i = 0) \wedge (s'_{f,i} \geq \varepsilon_{ml})) \\ 0, \text{ otherwise} \end{cases} \qquad (28)$$

where m"=1 is foreground, m"=0 is background and for example, $\varepsilon_{ml}=6$.

In one embodiment, updated weights are computed as follows:

$$\hat{w}'_{f,i} = \begin{cases} 1, \text{ if } m''_i = 1 \\ 0, \text{ otherwise} \end{cases} \qquad (29)$$

$$\hat{w}'_{b,i} = \begin{cases} 1, \text{ if } m''_i = 0 \\ 0, \text{ otherwise} \end{cases}$$

In one embodiment, weights are summed over a neighborhood $N'_{(j)}$.

$$\hat{s}'_{f,i} = \sum_{n \in N'_{a,(i)}} \hat{w}'_{f,i} + \sum_{n \in N'_{b,(i)}} w'_{f,i} \qquad (30)$$

$$\hat{s}'_{b,i} = \sum_{n \in N'_{a,(i)}} \hat{w}'_{b,i} + \sum_{n \in N'_{b,(i)}} w'_{b,i}$$

where $N'_{a,(i)}$ and $N'_{b,(i)}$ is $N'_{(i)}$ divided into causal (i.e. n<i) and non-causal (i.e. n>i) regions.

In one embodiment the final mask, m, is:

$$m_i = \begin{cases} 1, \text{ if } (\hat{s}'_{b,i} < \varepsilon_{m2,i}) \\ 0, \text{ if } (\hat{s}'_{f,i} < \varepsilon_{m2,i}) \\ m''_i, \text{ otherwise} \end{cases} \qquad (31)$$

where for example, $\varepsilon_{m2,i}=5$ if $x_{f,i}=x_{b,i}$ (Sub-step Ib cases 1 and 2 for j=1), and $\varepsilon_{m2,i}=1$ if $x_{f,i} \neq x_{b,i}$ (Sub-step Ib case 3 for j=1).

Sub-Step IVc

In one embodiment, given the final mask, update foreground and background images as follows.

$$x''_{f,i} = \begin{cases} x_i, \text{ if } m_i = 1 \\ x'_{f,i}, \text{ otherwise} \end{cases} \qquad (32)$$

$$x''_{b,i} = \begin{cases} x_i, \text{ if } m_i = 0 \\ x'_{b,i}, \text{ otherwise} \end{cases}$$

Sub-Step Va

New lowpass coefficients are computed. In one embodiment, the weights for the foreground and background $w_{f,i}''^j$ and $w_{b,i}''^j$ for level j, j=1, . . . , J are computed as $$w_{f,i}''^j = \begin{cases} 1, \text{ if } m_{1+i'} = 1 \\ 0, \text{ otherwise} \end{cases} \qquad (33)$$

$$w_{b,i}''^j = \begin{cases} 1, \text{ if } m_{1+i'} = 0 \\ 0, \text{ otherwise} \end{cases}$$

where i' is any value in the range 0, . . . , $2^{j-1}-1$ and for example, J=5.

For the foreground, let $$s_{f,i}''^j = w_{f,i}''^j + w_{f,i+2^{j-1}}''^j.$$

If $s_{f,i}''^j > 0$, then $$c_{f,i}''^j = \frac{w_{f,i}''^j \cdot c_{f,i}''^{j-1} + w_{f,i+2^{j-1}}''^j \cdot c_{f,i+2^{j-1}}''^{j-1}}{s_{f,i}''^j} \qquad (34)$$

where $$c''^0_{f,i} = x''_{f,i} \qquad (35)$$

Otherwise, the usual forward Haar transform may be used (which may have already been computed in a previous step), $$c_{f,i}''^j = \frac{c_{f,i}''^{j-1} + c_{f,i+2^{j-1}}''^{j-1}}{2} \qquad (36)$$

The background is computed in the same manner.

Sub-Step Vb

In one embodiment, sub-step Vb is computed for levels j=J . . . 1 as follows for the foreground.

Case 1: If $w_{f,i}''^{j-1}=1$, then $\hat{c}_{f,i}''^{j-1}=c_{f,i}''^{j-1}$ is unchanged.

Otherwise, in one embodiment, the updated weights are computed as follows, $$\hat{w}_{f,i}''^j = \begin{cases} 1, \text{ if } \tilde{m}_{i+i''} = -1 \\ 0, \text{ otherwise} \end{cases} \qquad (37)$$

$$\hat{w}_{b,i}''^j = \begin{cases} 1, \text{ if } \tilde{m}_{i+i''} = 1 \\ 0, \text{ otherwise} \end{cases}$$

where i" is any value in the range $$\sum_{k=1}^{J-j} -2^{J-1-k}, \ldots, 2^J - 1$$

$$\hat{s}_{f,i}''^j = \hat{w}_{f,i-2^{j-1}}''^j + \hat{w}_{f,i}''^j \qquad (38)$$

Case 2a: If $\hat{s}''^{j}_{f,i}>0$ then $$\hat{c}''^{j-1}_{f,i} = \frac{\hat{w}''^{j}_{f,i-2^{j-1}} \cdot c''^{j}_{f,i-2^{j-1}} + \hat{w}''^{j}_{f,i} \cdot c''^{j}_{f,i}}{\hat{s}''^{j}_{f,i}} \quad (39)$$

Case 2b: Otherwise, $$\hat{c}''^{j-1}_{f,i} = \frac{c''^{j}_{f,i-2^{j-1}} + c''^{j}_{f,i}}{2} \quad (40)$$

The background is computed in the same manner. In one embodiment, the final foreground and background results are:

$$\hat{x}_{f,i} = \hat{c}''^{0}_{f,i}$$

$$\hat{x}_{b,i} = \hat{c}''^{0}_{b,i} \quad (41)$$

Numerical 1-Dimension Example

FIG. 16 shows a numerical example of Steps I to IIIa for a 1-dimension signal x. For Sub-Step Ib, differences $$|c^{j}_{i} - c^{j}_{i+2^{j}}|$$

are underlined if they exceed the threshold $\epsilon^{j}$ and are not computed (shown as "---" in the table) if the corresponding difference for a previous level exceeded the threshold. For Step II, differences $|x_{f,i} - x_{b,i}|$ are underlined if they exceed the threshold t. For Step IIIa, "don't care" values are shown as "---".

FIG. 17 continues the example by repeating Sub-Step IIIa and showing Steps IIIb to IV.

FIGS. 18 and 19 show Step V for the foreground and background respectively. "Don't care" values are shown as "---". The first time a location (index i) that was previously "don't care" is assigned a value is shown underlined in Sub-step Va and the first level of Sub-step Vb. For the remaining levels in Sub-step Vb, the case unchanged values are shown underlined.

Extension to 2-Dimensions and Color

Several extensions to the 1-dimension mathematical description given above allow the handling of image data, color data and other higher dimensional data. When processing color data instead of grayscale data (or more generally vector data instead of scalar data), absolute value used for distances can be replaced by a norm such as $L_1$, $L_2$, $L_\infty$ or by a color difference measure such as $\Delta E$. A color transform such as RGB to YUV may be applied to color data before segmentation and fill. Thresholds should be adjusted to be consistent with the norm or color difference measure, for example, the thresholds may be multiplied by the number of color components when using a $L_1$ metric.

The extension from 1-dimensional signals to 2-dimensional signals such as images or higher dimension signals such as volume data can use the Haar transform in these higher dimensions. In general, the index i in the equations above are replaced with indices for each dimension. For 2-dimensions, computations i and $i \pm 2^j$ would be replaced with computations at i,l; $i \pm 2^j$,l; i,$l \pm 2^j$; and $i \pm 2^j$,$l \pm 2^j$.

Alternatives and Improvements

Using page segmentation or document layout analysis to find text and/or line art regions, this method could be used only on text and/or line at regions. If page segmentation is used, a JPM image could be created with multiple regions each having a foreground image, background image and mask. In a JPM file, background images would be self masking image objects and masks would be in the same object as foreground images.

Isolating solid backgrounds from images would improve subjective quality in some cases.

The resolution levels J in steps 1, 3 and 5 may depend on additional available classification data (e.g., halftone vs. non-halftone classification).

Alternatives for Modifying Filter Coefficients Based on Masks

Using the notation in the equations above, a number of alternative implementations can be described. In one embodiment, equation 13 in Step IIIa is replaced with either of the following two alternative ways to compute $w^{j}_{f,i}$ and $w^{j}_{b,i}$. In one embodiment, similar changes are made in Step IIIb for $\hat{w}^{j}_{f,i}$ and $\hat{w}^{J}_{b,i}$, in Step Va for $W''^{j}_{f,i}$ and $W''^{j}_{b,i}$, and in Step Vb for $\hat{w}''^{j}_{f,i}$ and $\hat{w}''^{j}_{b,i}$. These change the way filter coefficients are affected by various masks. For each of these operations, any of the three alternatives (Equation 13, 42 or 43) may be independently chosen.

$$w^{j}_{f,i} = \sum_{k=1}^{i+i'} \frac{1 - \tilde{m}_{i+i'}}{2} \quad (42)$$

$$w^{j}_{b,i} = \sum_{k=1}^{i+i'} \frac{1 - \tilde{m}_{i+i'}}{2}$$

$$w^{j}_{f,i} = \sum_{k=1}^{i+i'} \begin{pmatrix} 1, \text{ if } \tilde{m}_{i+i'} = -1 \\ 0, \text{ otherwise} \end{pmatrix} \quad (43)$$

$$w^{j}_{b,i} = \sum_{k=1}^{i+i'} \begin{pmatrix} 1, \text{ if } \tilde{m}_{i+i'} = 1 \\ 0, \text{ otherwise} \end{pmatrix}$$

Lossy Compression

Although the multi-resolution segmentation and fill technique is useful for lossless compression, it may be used for lossy compression or both. For example, an additional processing step may be applied to the foreground/background image (e.g. noise removal, which results in lossy compression).

As set forth above, for lossless compression (or both lossless and lossy compression), the foreground and background match the original image for pixels selected as foreground and background, respectively, by the mask, and the foreground, background and mask are compressed losslessly. For lossy compression only, the requirement that the foreground and background match the original image can be relaxed. This can give better rate-distortion for lossy compression, particularly at very high compression ratios.

In one embodiment, the foreground and/or background image is scaled to a lower resolution. (The foreground and background images matches their corresponding parts in a lower resolution version of the original image where selected by the mask.) For a print resolution image (e.g. 300, 400, 600, 800, 1200 DPI or higher), the foreground (and background) may be scaled to a lower resolution such as 75, 100, 150 or 200 DPI. Additionally, a high resolution image may be scaled to a lower resolution before applying a technique described herein, which reduces the resolution of the foreground, background and mask.

In another embodiment, instead of matching the exact match requirement, the inside foreground (background)

regions match, while not require matching at edges. The area corresponding to edges may be defined in terms of the imaging system such as pixels neighboring pixels of a different classification or based on DPI (resolution, contrast and the Human Visual Systems contrast sensitivity function). Non-edge portions of regions are "inside." This will be called "lossy edge" fill in contrast to "strict" fill. Lossy edge fill can take advantage of the Human Visual System visual masking property, which is that strong edges reduce the visibility of other lower magnitude compression artifacts at these edge locations. When generating the foreground (and background), locations are considered "don't' care" if (usual case) the mask does not select them for foreground (background) or if (lossy edge case) the mask selects them for foreground (background), the mask does not select a neighboring location and at least one of the neighbors has all of its neighbors selected.

Figure 21:
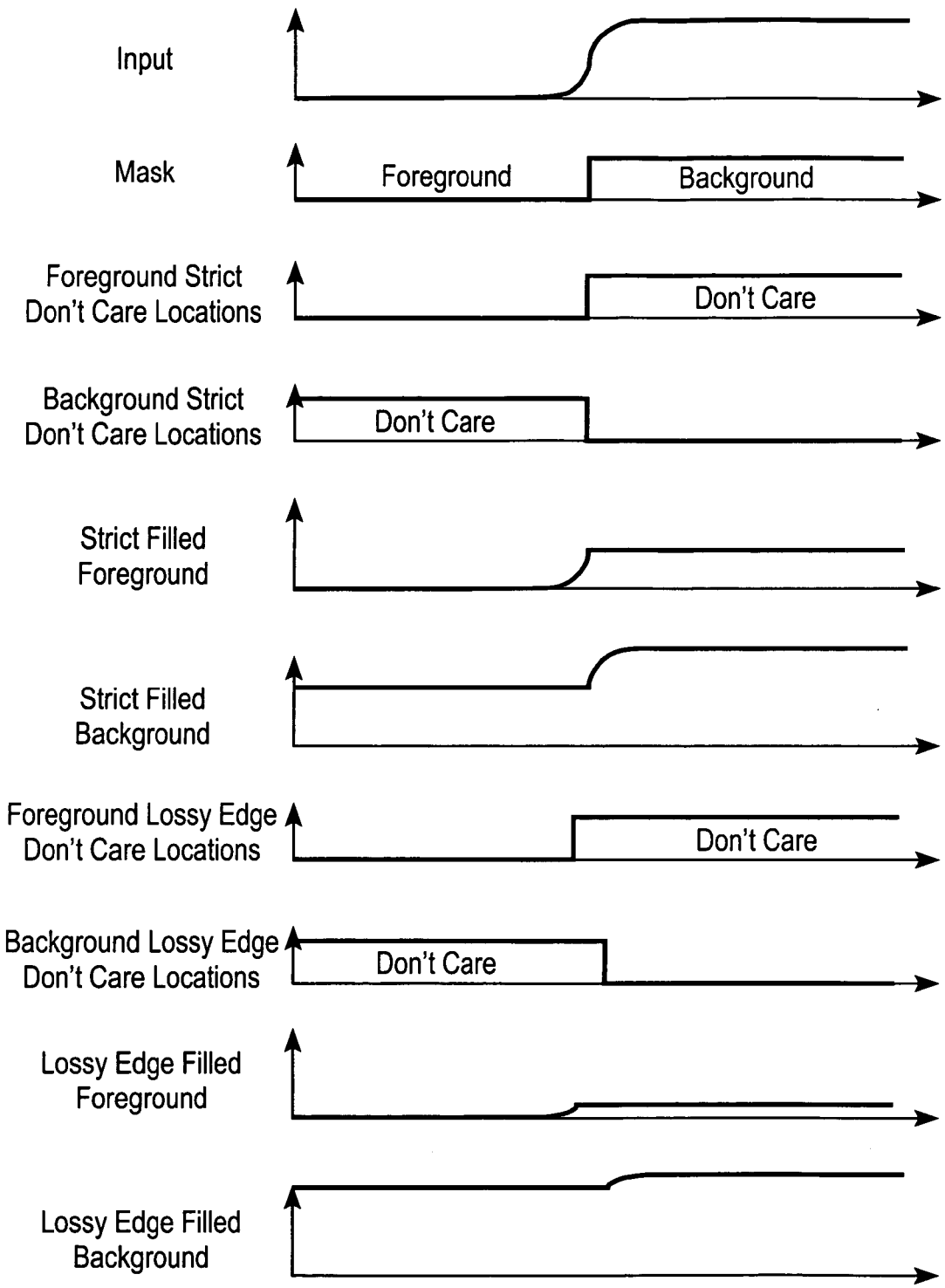
FIG. 21 illustrates a 1D lossy edge.

Neighboring locations may be 4-connected, 8-connected or defined by some other morphological structuring element. The "at least one of the neighbors has all of its neighbors selected" part of the condition prevents regions of foreground (background) smaller than the neighborhood from being entirely "don't care." (In the creation of the mask, it may be desirable to minimize, or at least reduce, the creation of small regions or to guarantee that small regions are never created. If regions smaller than the neighborhood size are never created, the lossy edge fill is simplified.) An example is set forth in FIG. 20. This is similar to a morphological dilation but avoids eliminating regions smaller than the structuring element. In an alternative embodiment, instead of treating locations at edges as "don't care," weights are used for computing filled values (e.g., $w''_{f,i}$ and $w''_{b,i}$ in equation (33) so that locations near edges have an intermediate value for the width such as 0.25 or 0.5 instead of 0 ("don't care") or 1 (lossless). This avoids needing to keep regions smaller than the neighborhood or using a complicated thinning algorithm (see FIG. 23). Making edges "lossy" has the often desirable effect of making edges sharper. An example is set forth in FIG. 21. This is particularly desirable for scanned text. A lossy edge case is a contrast sensitivity function, which could be applied to foreground and background image in order to perform visual mashing. A lossy edge case is a contrast sensitivity function, which could be applied to foreground and background images in order to perform visual masking.

An Exemplary Computer System

Figure 22:
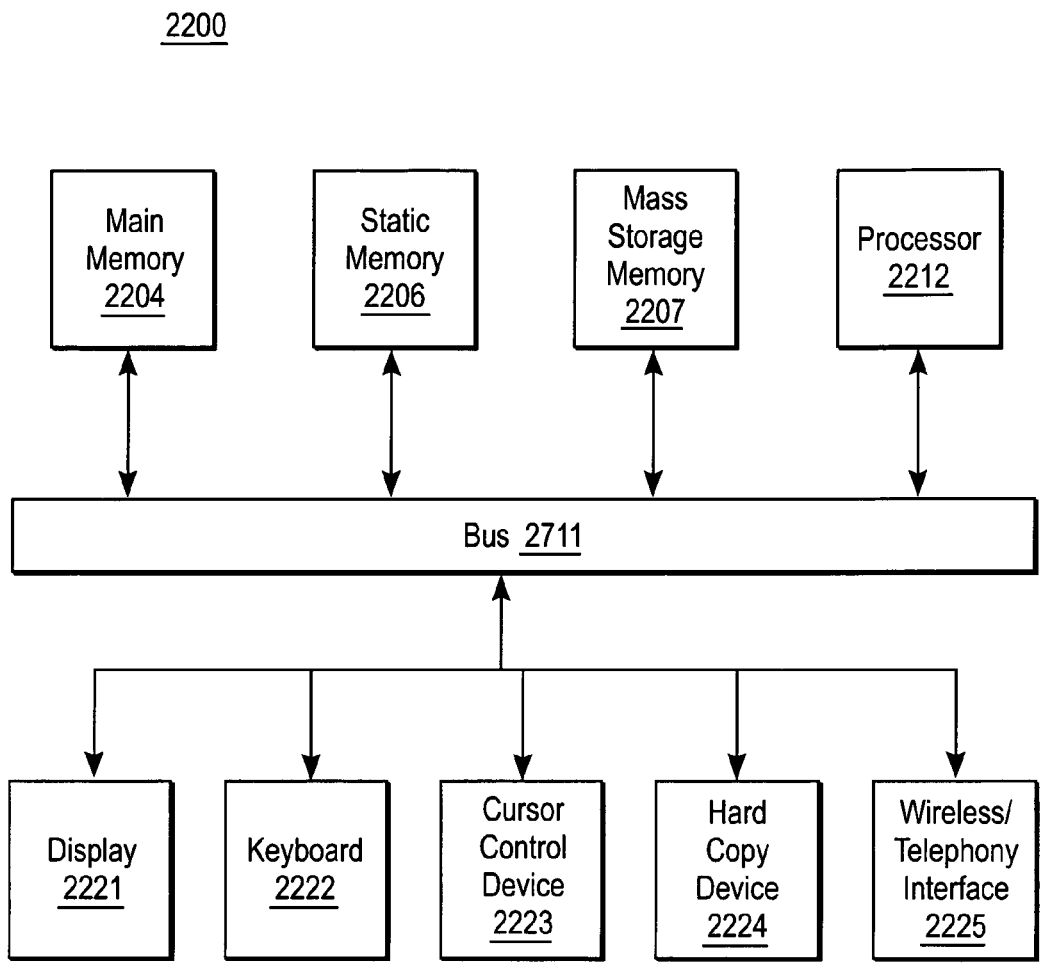
FIG. 22 is a block diagram of an exemplary computer system that may perform one or more of the operations described herein.

FIG. 22 is a block diagram of an exemplary computer system that may perform one or more of the operations described herein. Referring to FIG. 22, computer system 2200 may comprise an exemplary client or server computer system. Computer system 2200 comprises a communication mechanism or bus 2211 for communicating information, and a processor 2712 coupled with bus 2711 for processing information. Processor 2212 includes a microprocessor but is not limited to a microprocessor, such as, for example, Pentium™, PowerPC™, Alpha™, etc.

System 2200 further comprises a random access memory (RAM), or other dynamic storage device 2204 (referred to as main memory) coupled to bus 2211 for storing information and instructions to be executed by processor 2212. Main memory 2204 also may be used for storing temporary variables or other intermediate information during execution of instructions by processor 2212.

Computer system 2200 also comprises a read only memory (ROM) and/or other static storage device 2206 coupled to bus 2211 for storing static information and instructions for processor 2212, and a data storage device 2207, such as a magnetic disk or optical disk and its corresponding disk drive. Data storage device 2207 is coupled to bus 2211 for storing information and instructions.

Computer system 2200 may further be coupled to a display device 2221, such as a cathode ray tube (CRT) or liquid crystal display (LCD), coupled to bus 2211 for displaying information to a computer user. An alphanumeric input device 2222, including alphanumeric and other keys, may also be coupled to bus 2211 for communicating information and command selections to processor 2212. An additional user input device is cursor control 2223, such as a mouse, trackball, trackpad, stylus, or cursor direction keys, coupled to bus 2211 for communicating direction information and command selections to processor 2212, and for controlling cursor movement on display 2221.

Another device that may be coupled to bus 2211 is hard copy device 2224, which may be used for printing instructions, data, or other information on a medium such as paper, film, or similar types of media. Furthermore, a sound recording and playback device, such as a speaker and/or microphone may optionally be coupled to bus 2211 for audio interfacing with computer system 2200. Another device that may be coupled to bus 2211 is a wired/wireless communication capability 2225 to communication to a phone or handheld palm device.

Note that any or all of the components of system 2200 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

We claim:

1. A method comprising:

analyzing, at a computer system, image data at each resolution for multiple resolutions of an image;

generating, at the computer system, a plurality of layers using a preliminary background image and preliminary foreground image created with low resolution image data relating to a plurality of lower resolution versions of the image, wherein the plurality of layers comprise a first background image and a first foreground image, including removing noise from the preliminary background image and preliminary foreground image to prevent halftone noise from entering a mask generated with the first background image and first foreground image;

generating, at the computer system, the mask describing compositing of the plurality of layers to obtain the image by comparing the image with the first background and first foreground images created using image data from multiple resolutions of the image, wherein the first foreground and first background image composite to the image using the mask; and filling pixels to obtain a second foreground and a second background image, at the computer system, in each of the plurality of layers of the first foreground image and first background image, by propagating foreground and background fill values at multiple resolutions, where the pixels being filled are those that do not contribute to the image when the plurality of layers are composited, wherein filling pixels includes using a contrast sensitivity function applied to the second foreground and second background image to perform visual masking.

2. The method defined in claim 1 further comprising compressing the layer images and the mask.

3. The method defined in claim 2 wherein compressing the layer images and the mask includes generating a JPM file.

4. The method defined in claim 1 further comprising compressing the layer images and the mask, including:
compressing the background and foreground images using a continuous tone compressor; and
compressing the mask using a binary compressor.

5. The method defined in claim 4 wherein the binary compressor is a JBIG-2 compressor.

6. The method defined in claim 4 wherein the binary compressor is a JBIG compressor.

7. The method defined in claim 4 wherein the continuous tone compressor is a JPEG 2000 compressor.

8. The method defined in claim 1 further comprising performing a pixel-by-pixel segmentation in which pixels are classified as foreground and background.

9. An tangible computer-readable medium storing instructions thereon which, when executed by a system, cause the system to perform a method comprising:
analyzing image data at each resolution for multiple resolutions of an image;
generating a plurality of layers using a preliminary background image and preliminary foreground image created with low resolution image data relating to a plurality of lower resolution versions of the image, wherein the plurality of layers comprise a first background image and a first foreground image, including removing noise from the preliminary background image and preliminary foreground image to prevent halftone noise from entering a mask generated with the first background image and first foreground image;
generating a mask describing compositing of the plurality of layers to obtain the image by comparing the image with the first background and first foreground images created using image data from multiple resolutions of the image, wherein the first foreground and first background image composite to the image using the mask; and
filling pixels to obtain a second foreground and second background image in each of the plurality of layers of the first foreground image and first background image, by propagating foreground and background fill values at multiple resolutions, where the pixels being filled are those that do not contribute to the image when the plurality of layers are composited, wherein filling pixels includes using a contrast sensitivity function applied to the second foreground and second background image to perform visual masking.

10. The tangible computer-readable medium defined in claim 9 wherein the method further comprises:
compressing the layer images and the mask.

11. The tangible computer-readable medium defined in claim 9 wherein compressing the layer images and the mask comprises:
compressing the background and foreground images using a continuous tone compressor; and
compressing the mask using a binary compressor.

12. The tangible computer-readable medium defined in claim 11 wherein the mask is compressed with a JBIG compressor.

13. The tangible computer-readable medium defined in claim 11 wherein the mask is compressed using a JBIG-2 compressor.

14. The tangible computer-readable medium defined in claim 11 wherein the mask is compressed using a JPEG 2000 compressor.

15. The tangible computer-readable medium defined in claim 9 wherein the method further comprises performing a pixel-by-pixel segmentation in which pixels are classified as foreground and background.

16. An apparatus comprising:
a memory to store an image; and
a processor coupled with the memory to execute
a first unit to analyze image data at each resolution for multiple resolutions of the image, and generate a plurality of layers using a preliminary background image and preliminary foreground image created with low resolution image data relating to a plurality of lower resolution versions of the image, wherein the plurality of layers comprise a first background image and a first foreground image, wherein the first unit removes noise from the preliminary background image and preliminary foreground image to prevent halftone noise from entering a mask generated with the first background image and first foreground image,
a second unit to generate a mask describing compositing of the plurality of layers to obtain the image by comparison of the image with the first background and first foreground images created using image data from multiple resolutions of the image, wherein the first foreground and first background image composite to the image using the mask, and
a third unit to fill pixels in each of the plurality of layers to obtain a second foreground and second background image, by propagating foreground and background fill values at multiple resolutions, where the pixels being filled are those that do not contribute to the image when the plurality of layers are composited, wherein the third unit fills pixels with a contrast sensitivity function applied to the second foreground and second background image to perform visual masking.

17. The apparatus defined in claim 16 further comprising a compressor to compressing the layer images and the mask.

18. The apparatus defined in claim 16 further comprising the compressor comprises:
a continuous tone compressor to compress the background and foreground images; and
a binary compressor to compress the mask.

19. The apparatus defined in claim 18 wherein the binary compressor is a JBIG-2 compressor.

20. The apparatus defined in claim 18 wherein the binary compressor is a JBIG compressor.

21. The apparatus defined in claim 18 wherein the continuous tone compressor is a JPEG 2000 compressor.

22. The apparatus defined in claim 16 wherein the first unit performs a pixel-by-pixel segmentation in which pixels are classified as foreground and background.

23. An apparatus comprising:
means for analyzing image data at each resolution for multiple resolutions of an image;
means for generating a plurality of layers using a preliminary background image and preliminary foreground image created with low resolution image data relating to a plurality of lower resolution versions of the image, wherein the plurality of layers comprise a first background image and a first foreground image, wherein the means for generating removes noise from the preliminary background image and preliminary foreground image to prevent halftone noise from entering a mask generated with the first background image and first foreground image;

means for generating a mask describing compositing of the plurality of layers to obtain the image by comparing the image with the first background and first foreground images created using image data from multiple resolutions of the image, wherein the first foreground and first background image composite to the image using the mask;

means for filling pixels in each of the plurality of layers to obtain a second foreground and second background image, by propagating foreground and background fill values at multiple resolutions, where the pixels being filled are those that do not contribute to the image when the plurality of layers are composited, wherein the means for filling pixels includes means for using a contrast sensitivity function applied to the second foreground and second background image to perform visual masking.

* * * * *